US012711669B2

(12) United States Patent
Zakharchenko et al.

(10) Patent No.: US 12,711,669 B2
(45) Date of Patent: Aug. 18, 2026

(54) SYSTEM AND METHOD FOR GEOMETRY POINT CLOUD CODING

(71) Applicant: GUANGDONG OPPO MOBILE TELECOMMUNICATIONS CORP., LTD., Dongguan (CN)

(72) Inventors: Vladyslav Zakharchenko, Palo Alto, CA (US); Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/119,057

(22) PCT Filed: Aug. 2, 2023

(86) PCT No.: PCT/US2023/029283
§ 371 (c)(1),
(2) Date: Apr. 7, 2025

(87) PCT Pub. No.: WO2024/085936
PCT Pub. Date: Apr. 25, 2024

(65) Prior Publication Data

US 2026/0017831 A1 Jan. 15, 2026

Related U.S. Application Data

(60) Provisional application No. 63/380,495, filed on Oct. 21, 2022.

(51) Int. Cl.
*G06T 9/00* (2006.01)
*H04N 19/119* (2014.01)
(Continued)

(52) U.S. Cl.
CPC ........... *G06T 9/001* (2013.01); *H04N 19/119* (2014.11); *H04N 19/124* (2014.11); *H04N 19/18* (2014.11);
(Continued)

(58) Field of Classification Search
CPC ....... G06T 9/001; G06T 9/007; H04N 19/119; H04N 19/124; H04N 19/18;
(Continued)

(56) References Cited

U.S. PATENT DOCUMENTS

2017/0347122 A1 11/2017 Chou et al.
2020/0092584 A1* 3/2020 Cai ........................ H04N 19/62
(Continued)

OTHER PUBLICATIONS

International Search Report and Written Opinion of the International Searching Authority regarding International Patent Application No. PCT/US2023/029283, dated Nov. 8, 2023.

*Primary Examiner* — Richard T Torrente
(74) *Attorney, Agent, or Firm* — Sheppard, Mullin, Richter & Hampton LLP

(57) ABSTRACT

A method for encoding a mesh that is represented in a one-dimensional (1D) array is provided. The method includes: applying mesh segmentation to the mesh to generate a segmented mesh; performing mesh decimation to the segmented mesh to generate a subdivided mesh; calculating a set of mesh displacements for at least one level-of-detail (LoD) based on the segmented mesh and the subdivided mesh using a coding mode of a plurality of coding modes; applying a wavelet transform to the set of mesh displacements to generate a plurality of wavelet-transform coefficients; quantizing the plurality of wavelet-transform coefficients to generate a plurality of quantized wavelet-transform coefficients; and encoding the plurality of quantized wavelet-transform coefficients to a zero-run length code.

20 Claims, 25 Drawing Sheets

500

(51) Int. Cl.

| | |
|---|---|
| ***H04N 19/124*** | (2014.01) |
| ***H04N 19/169*** | (2014.01) |
| ***H04N 19/18*** | (2014.01) |
| ***H04N 19/63*** | (2014.01) |
| ***H04N 19/70*** | (2014.01) |
| ***H04N 19/93*** | (2014.01) |

(52) U.S. Cl.
CPC ......... *H04N 19/1883* (2014.11); *H04N 19/63* (2014.11); *H04N 19/70* (2014.11); *H04N 19/93* (2014.11)

(58) Field of Classification Search
CPC .... H04N 19/1883; H04N 19/63; H04N 19/70; H04N 19/93; H04N 19/85; H04N 19/597
See application file for complete search history.

(56) References Cited

U.S. PATENT DOCUMENTS

| | | | | |
|---|---|---|---|---|
| 2021/0118190 | A1 | 4/2021 | Mammou et al. | |
| 2023/0412849 | A1* | 12/2023 | Huang | H04N 19/91 |
| 2024/0007670 | A1* | 1/2024 | Huang | H04N 19/70 |
| 2026/0073570 | A1* | 3/2026 | Yoon | G06T 9/001 |
| 2026/0095575 | A1* | 4/2026 | Kadam | H04N 19/14 |

* cited by examiner

101

201

500

600

625

650

675

800

900

```
# -----------------------------
# Part 1 :
#  geometry information
#   X  Y  Z  a_1  a_2  a_3
#  vertex  0 (v_idx_0)
v   0.0 0.0 0.0 127 127 127
#  vertex 1 (v_idx_1)
v   1.0 0.0 0.0 127 127 127
#  vertex 2 (v_idx_2)
v   0.0 1.0 0.0 127 127 127
#  vertex 3 (v_idx_3)
v   0.0 0.0 1.0 127 127 127
# -----------------------------
# Part 2 :
#  connectivity information
# v_idx, v_idx, v_idx
# face 0 (f_idx_0)
f  0     1        2
# face 1 (f_idx_1)
f  0     3        1
# face 2 (f_idx_2)
f  0     2        3
# -----------------------------
```

1000

1200

```
# -------------------------------
# Part 1 :
#  geometry information
# X  Y   Z
# vertex 0 (v_idx_0)
v  0.0 0.0 0.0
# vertex 1 (v_idx_1)
v  1.0 0.0 0.0
# vertex 2 (v_idx_2)
v  0.0 1.0 0.0
# vertex 3 (v_idx_3)
v  0.0 0.0 1.0
# -------------------------------
# Part 2 :
#  mapping information
# U  V
#  texture vertex 0 (vt_0)
vt 0.500000 0.500000
#  texture vertex 1 (vt_1)
vt 0.000000 0.500000
#  texture vertex 2 (vt_2)
vt 0.500000 1.000000
#  texture vertex 3 (vt_3)
vt 1.000000 0.500000
#  texture vertex 4 (vt_4)
vt 0.500000 0.000000
# -------------------------------
# Part 3 :
#  connectivity information
#  v_idx / vt_idx
# face 0 (f_idx_0)
f  0/0 1/2 2/1
# face 1 (f_idx_1)
f  0/0 3/2 1/3
# face 2 (f_idx_2)
f  0/0 2/3 3/4
```

1300

1500

1525

1550

1600

1625

1650

1700

1725

1925

Exp-Golomb-*k* coding examples

| *x* | *k*=0 | *k*=1 | *k*=2 | *k*=3 | *x* | *k*=0 | *k*=1 | *k*=2 | *k*=3 | *x* | *k*=0 | *k*=1 | *k*=2 | *k*=3 |
|---|---|---|---|---|---|---|---|---|---|---|---|---|---|---|
| 0 | 1 | 10 | 100 | 1000 | 10 | 0001011 | 001100 | 01110 | 010010 | 20 | 000010101 | 00010110 | 0011000 | 011100 |
| 1 | 010 | 11 | 101 | 1001 | 11 | 0001100 | 001101 | 01111 | 010011 | 21 | 000010110 | 00010111 | 0011001 | 011101 |
| 2 | 011 | 0100 | 110 | 1010 | 12 | 0001101 | 001110 | 0010000 | 010100 | 22 | 000010111 | 00011000 | 0011010 | 011110 |
| 3 | 00100 | 0101 | 111 | 1011 | 13 | 0001110 | 001111 | 0010001 | 010101 | 23 | 000011000 | 00011001 | 0011011 | 011111 |
| 4 | 00101 | 0110 | 01000 | 1100 | 14 | 0001111 | 00010000 | 0010010 | 010110 | 24 | 000011001 | 00011010 | 0011100 | 00100000 |
| 5 | 00110 | 0111 | 01001 | 1101 | 15 | 000010000 | 00010001 | 0010011 | 010111 | 25 | 000011010 | 00011011 | 0011101 | 00100001 |
| 6 | 00111 | 001000 | 01010 | 1110 | 16 | 000010001 | 00010010 | 0010100 | 011000 | 26 | 000011011 | 00011100 | 0011110 | 00100010 |
| 7 | 0001000 | 001001 | 01011 | 1111 | 17 | 000010010 | 00010011 | 0010101 | 011001 | 27 | 000011100 | 00011101 | 0011111 | 00100011 |
| 8 | 0001001 | 001010 | 01100 | 010000 | 18 | 000010011 | 00010100 | 0010110 | 011010 | 28 | 000011101 | 00011110 | 000100000 | 00100100 |
| 9 | 0001010 | 001011 | 01101 | 010001 | 19 | 000010100 | 00010101 | 0010111 | 011011 | 29 | 000011110 | 00011111 | 000100001 | 00100101 |

Decode a base mesh from a bitstream
2202

Perform mesh segmentation on the base mesh to generate a subdivided mesh indicated by the bitstream
2204

Decode a first syntax element that indicates a first LoD associated with a sequence of frames
2206

Decode a second syntax element that indicates a first coding mode associated with the sequence of frames at the first LoD
2208

Decode a first zero-run length code to generate a first plurality of wavelet-transform coefficients based on the first LoD and the first coding mode associated with the sequence of frames
2210

Generate a first set of mesh displacements for the sequence of frames based on the first plurality of wavelet-transform coefficients
2212

Generate a first reconstructed mesh based on the subdivided mesh and the first set of mesh displacements
2214

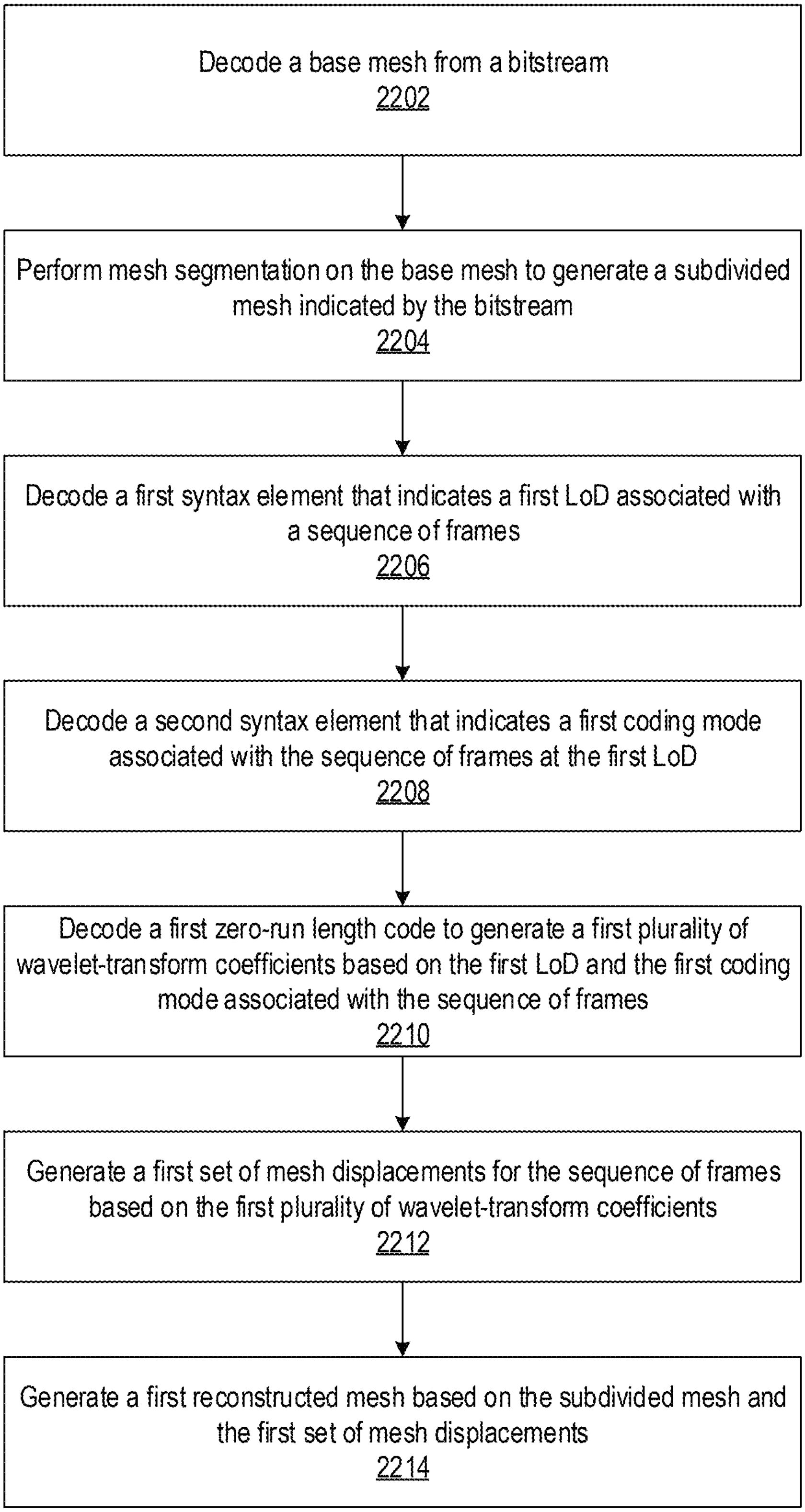

FIG. 22

SYSTEM AND METHOD FOR GEOMETRY POINT CLOUD CODING

CROSS-REFERENCE TO RELATED APPLICATIONS

This application is a national phase entry under 35 USC 371 of International Patent Application No. PCT/US2023/029283 filed on Aug. 2, 2023, which claims the benefit of priority to U.S. Provisional Application No. 63/380,495, filed Oct. 21, 2022, entitled "DYNAMIC MESH GEOMETRY REFINEMENT COMPONENT ADAPTIVE CODING," which are incorporated by reference herein in their entireties.

BACKGROUND

Embodiments of the present disclosure relate to point cloud coding.

Point clouds are one of the major three-dimension (3D) data representations, which provide, in addition to spatial coordinates, attributes associated with the points in a 3D world. Point clouds in their raw format require a huge amount of memory for storage or bandwidth for transmission. Furthermore, the emergence of higher resolution point cloud capture technology imposes, in turn, even a higher requirement on the size of point clouds. In order to make point clouds usable, compression is necessary. Two compression technologies have been proposed for point cloud compression/coding (PCC) standardization activities: video-based PCC (V-PCC) and geometry-based PCC (G-PCC). V-PCC approach is based on 3D to two-dimensional (2D) projections, while G-PCC, on the contrary, encodes the content directly in 3D space. In order to achieve that, G-PCC utilizes data structures, such as an octree that describes the point locations in 3D space.

SUMMARY

According to one aspect of the present disclosure, a method for encoding a mesh that is represented in a one-dimensional (1D) array that includes a set of points is provided. The method may include applying, by at least one processor, mesh segmentation to the mesh to generate a segmented mesh. The method may include performing, by the at least one processor, mesh decimation to the segmented mesh to generate a subdivided mesh. The method may include calculating, by the at least one processor, a set of mesh displacements for at least one level-of-detail (LoD) based on the segmented mesh and the subdivided mesh using a coding mode of a plurality of coding modes. The method may include applying, by the at least one processor, a wavelet transform to the set of mesh displacements to generate a plurality of wavelet-transform coefficients. The method may include quantizing, by the at least one processor, the plurality of wavelet-transform coefficients to generate a plurality of quantized wavelet-transform coefficients. The method may include encoding, by the at least one processor, the plurality of quantized wavelet-transform coefficients to a zero-run length code.

According to another aspect of the present disclosure, a system for encoding a mesh that is represented in a 1D array that includes a set of points is provided is provided. The system may include at least one processor and memory storing instructions. The memory storing instructions, which when executed by the at least one processor, may cause the at least one processor to apply mesh segmentation to the mesh to generate a segmented mesh. The memory storing instructions, which when executed by the at least one processor, may cause the at least one processor to perform mesh decimation to the segmented mesh to generate a subdivided mesh. The memory storing instructions, which when executed by the at least one processor, may cause the at least one processor to calculate a set of mesh displacements for at least one LoD based on the segmented mesh and the subdivided mesh using a coding mode of a plurality of coding modes. The memory storing instructions, which when executed by the at least one processor, may cause the at least one processor to apply a wavelet transform to the set of mesh displacements to generate a plurality of wavelet-transform coefficients. The memory storing instructions, which when executed by the at least one processor, may cause the at least one processor to quantize the plurality of wavelet-transform coefficients to generate a plurality of quantized wavelet-transform coefficients. The memory storing instructions, which when executed by the at least one processor, may cause the at least one processor to encode the plurality of quantized wavelet-transform coefficients to a zero-run length code.

According to one aspect of the present disclosure, a method for decoding a mesh that is represented in a 1D array that includes a set of points is provided. The method may include decoding, by a at least one processor, a base mesh from a bitstream. The method may include performing, by the at least one processor, mesh segmentation on the base mesh to generate a subdivided mesh indicated by the bitstream. The method may include decoding, by the at least one processor, a first syntax element that indicates a first LoD associated with a sequence of frames. The method may include decoding, by the at least one processor, a second syntax element that indicates a first coding mode associated with the sequence of frames at the first LoD. The method may include decoding, by the at least one processor, a first zero-run length code to generate a first plurality of wavelet-transform coefficients based on the first LoD and the first coding mode associated with the sequence of frames. The method may include generating, by the at least one processor, a first set of mesh displacements for the sequence of frames based on the first plurality of wavelet-transform coefficients. The method may include generating, by the at least one processor, a first reconstructed mesh based on the subdivided mesh and the first set of mesh displacements.

According to still a further aspect of the present disclosure, a system for decoding a mesh that is represented in a 1D array is provided. The system may include at least one processor and memory storing instructions. The memory storing instructions, which when executed by the at least one processor, may cause the at least one processor to decode a base mesh from a bitstream. The memory storing instructions, which when executed by the at least one processor, may cause the at least one processor to perform mesh segmentation on the base mesh to generate a subdivided mesh indicated by the bitstream. The memory storing instructions, which when executed by the at least one processor, may cause the at least one processor to decode a first syntax element that indicates a first LoD associated with a sequence of frames. The memory storing instructions, which when executed by the at least one processor, may cause the at least one processor to decode a second syntax element that indicates a coding mode associated with the sequence of frames at the first LoD. The memory storing instructions, which when executed by the at least one processor, may cause the at least one processor to decode a first zero-run length code to generate a first plurality of wavelet-transform coefficients based on the first LoD and the first coding mode associated with the sequence of frames. The memory storing instructions, which when executed by the at least one processor, may cause the at least one processor to generate a first set of mesh displacements for the sequence of frames based on the first plurality of wavelet-transform coefficients. The memory storing instructions, which when executed by the at least one processor, may cause the at least one processor to generate a first reconstructed mesh based on the subdivided mesh and the first set of mesh displacements.

These illustrative embodiments are mentioned not to limit or define the present disclosure, but to provide examples to aid understanding thereof. Additional embodiments are described in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 19B illustrates an exponential-Golomb-k coding example, according to some embodiments of the present disclosure.

FIG. 22 illustrates a flowchart for a first mesh-decoding technique, according to some embodiments of the present disclosure.

Figure 1:
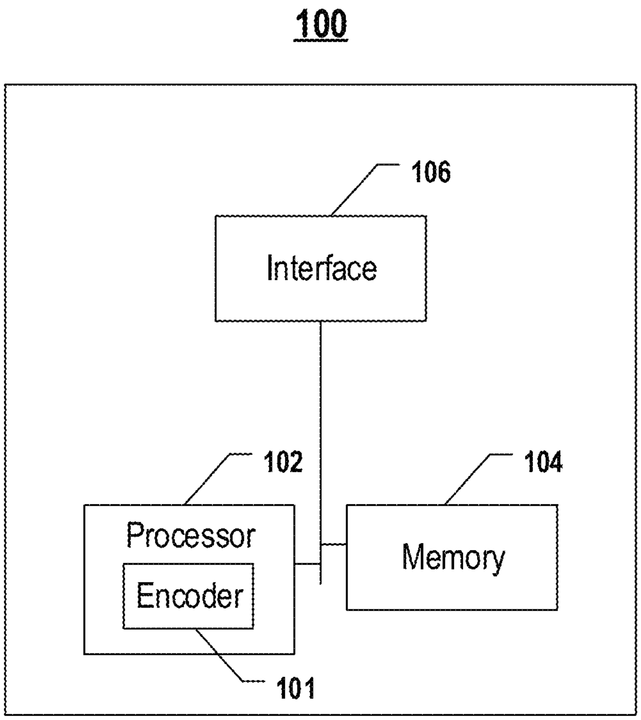
FIG. 1 illustrates a block diagram of an exemplary encoding system, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of point cloud coding systems will now be described with reference to various apparatus and methods. These apparatus and methods will be described in the following detailed description and illustrated in the accompanying drawings by various modules, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system. The techniques described herein may be used for various point cloud coding applications. As described herein, point cloud coding includes both encoding and decoding a point cloud.

A point cloud is composed of a collection of points in a 3D space. Each point in the 3D space is associated with a geometry position together with the associated attribute information (e.g., color, reflectance, intensity, classification, etc.). In order to compress the point cloud data efficiently, the geometry of a point cloud can be compressed first, and then the corresponding attributes, including color or reflectance, can be compressed based upon the geometry information according to a point cloud coding technique, such as G-PCC. G-PCC has been widely used in virtual reality/augmented reality (VR/AR), telecommunication, autonomous vehicle, etc., for entertainment and industrial applications, e.g., light detection and ranging (LiDAR) sweep compression for automotive or robotics and high-definition (HD) map for navigation. Moving Picture Experts Group (MPEG) released the first version G-PCC standard, and Audio Video Coding Standard (AVS) is also developing a G-PCC standard.

The existing G-PCC standards, however, cannot work well for a wide range of PCC inputs for many different applications. For example, besides the representation of levels (or coefficients in some cases), the representation of other information (e.g., parameters) used for G-PCC may be coded in the forms of syntax elements in the bitstream as well. Since G-PCC is organized in different levels by dividing a collection of points into different pieces (e.g., sequence, slices, etc.) associated with different properties (e.g., geometry, attributes, etc.), the parameter sets are also arranged in different levels (e.g., sequence-level, property-level, slice-level, etc.), for example, in the different headers. Moreover, multiple condition checks may be required for parsing some syntax elements in G-PCC, which further increases the complexity of organizing and parsing the representation of syntax elements.

To improve the flexibility and generality of point cloud coding, the present disclosure provides various novel schemes of syntax element representation and organization, which are compatible with any suitable G-PCC standards, including, but not limited to, AVS G-PCC standards and MPEG G-PCC standards.

Figure 2:
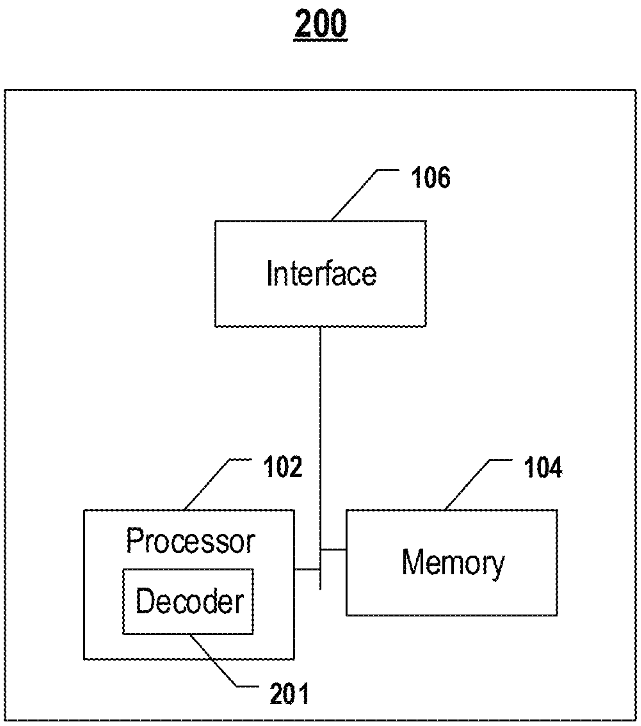
FIG. 2 illustrates a block diagram of an exemplary decoding system, according to some embodiments of the present disclosure.

FIG. 1 illustrates a block diagram of an exemplary encoding system 100, according to some embodiments of the present disclosure. FIG. 2 illustrates a block diagram of an exemplary decoding system 200, according to some embodiments of the present disclosure. Each system 100 or 200 may be applied or integrated into various systems and apparatuses capable of data processing, such as computers and wireless communication devices. For example, system 100 or 200 may be the entirety or part of a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having data processing capability. As shown in FIGS. 1 and 2, system 100 or 200 may include a processor 102, a memory 104, and an interface 106. These components are shown as connected one to another by a bus, but other connection types are also permitted. It is understood that system 100 or 200 may include any other suitable components for performing functions described here.

Processor 102 may include microprocessors, such as graphic processing unit (GPU), image signal processor (ISP), central processing unit (CPU), digital signal processor (DSP), tensor processing unit (TPU), vision processing unit (VPU), neural processing unit (NPU), synergistic processing unit (SPU), or physics processing unit (PPU), microcontroller units (MCUs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Although only one processor is shown in FIGS. 1 and 2, it is understood that multiple processors can be included. Processor 102 may be a hardware device having one or more processing cores. Processor 102 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

Memory 104 can broadly include both memory (a.k.a, primary/system memory) and storage (a.k.a. secondary memory). For example, memory 104 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 102. Broadly, memory 104 may be embodied by any computer-readable medium, such as a non-transitory computer-readable medium. Although only one memory is shown in FIGS. 1 and 2, it is understood that multiple memories can be included.

Interface 106 can broadly include a data interface and a communication interface that is configured to receive and transmit a signal in a process of receiving and transmitting information with other external network elements. For example, interface 106 may include input/output (I/O) devices and wired or wireless transceivers. Although only one memory is shown in FIGS. 1 and 2, it is understood that multiple interfaces can be included.

Processor 102, memory 104, and interface 106 may be implemented in various forms in system 100 or 200 for performing point cloud coding functions. In some embodiments, processor 102, memory 104, and interface 106 of system 100 or 200 are implemented (e.g., integrated) on one or more system-on-chips (SoCs). In one example, processor 102, memory 104, and interface 106 may be integrated on an application processor (AP) SoC that handles application processing in an operating system (OS) environment, including running point cloud encoding and decoding applications. In another example, processor 102, memory 104, and interface 106 may be integrated on a specialized processor chip for point cloud coding, such as a GPU or ISP chip dedicated to graphic processing in a real-time operating system (RTOS).

As shown in FIG. 1, in encoding system 100, processor 102 may include one or more modules, such as an encoder 101. Although FIG. 1 shows that encoder 101 is within one processor 102, it is understood that encoder 101 may include one or more sub-modules that can be implemented on different processors located closely or remotely with each other. Encoder 101 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to point cloud encoding, such as voxelization, transformation, quantization, arithmetic encoding, etc., as described below in detail.

Similarly, as shown in FIG. 2, in decoding system 200, processor 102 may include one or more modules, such as a decoder 201. Although FIG. 2 shows that decoder 201 is within one processor 102, it is understood that decoder 201 may include one or more sub-modules that can be implemented on different processors located closely or remotely with each other. Decoder 201 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to point cloud decoding, such as arithmetic decoding, dequantization, inverse transformation, reconstruction, synthesis, as described below in detail.

Figure 3:
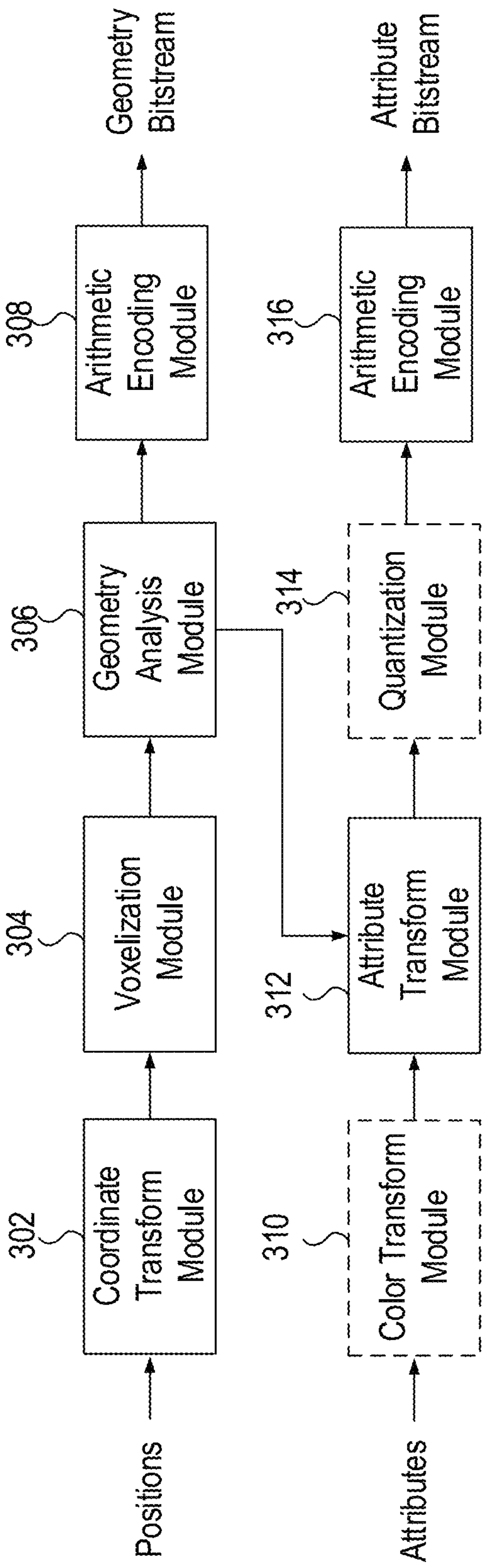
FIG. 3 illustrates a detailed block diagram of an exemplary encoder in the encoding system in FIG. 1, according to some embodiments of the present disclosure.

FIG. 3 illustrates a detailed block diagram of exemplary encoder 101 in encoding system 100 in FIG. 1, according to some embodiments of the present disclosure. As shown in FIG. 3, encoder 101 may include a coordinate transform module 302, a voxelization module 304, a geometry analysis module 306, and an arithmetic encoding module 308, together configured to encode positions associated with points of a point cloud into a geometry bitstream (i.e., geometry encoding). As shown in FIG. 3, encoder 101 may also include a color transform module 310, an attribute transform module 312, a quantization module 314, and an arithmetic encoding module 316, together configured to encode attributes associated with points of a point cloud into an attribute bitstream (i.e., attribute encoding). It is understood that each of the elements shown in FIG. 3 is independently shown to represent characteristic functions different from each other in a point cloud encoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on encoder 101. It is still further understood that the modules shown in FIG. 3 are for illustrative purposes only, and in some examples, different modules may be included in encoder 101 for point cloud encoding.

As shown in FIG. 3, geometry positions and attributes associated with points may be encoded separately. A point cloud may be a collection of points with positions $X_k=(x_k, y_k, z_k)$, k=1, . . . , K, where K is the number of points in the point cloud, and attributes $A_k=(A_{1k}, A_{2k}, \ldots, A_{Dk})$, k=1, . . . , K, where D is the number of attributes for each point. In some embodiments, attribute coding depends on decoded geometry. As a consequence, point cloud positions may be coded first. Since geometry positions may be represented by floating-point numbers in an original coordinate system, coordinate transform module 302 and a voxelization module 304 may be configured to perform a coordinate transformation followed by voxelization that quantizes and removes duplicate points. The process of position quantization, duplicate point removal, and assignment of attributes to the remaining points is called voxelization. The voxelized point cloud may be represented using, for example, an octree structure in a lossless manner. Geometry analysis module 306 may be configured to perform geometry analysis using, for example, the octree or trisoup scheme. Arithmetic encoding module 308 may be configured to arithmetically encode the resulting structure from geometry analysis module 306 into the geometry bitstream.

In some embodiments, geometry analysis module 306 is configured to perform geometry analysis using the octree scheme. Under the octree scheme, a cubical axis-aligned bounding box B may be defined by the two extreme points (0,0,0) and $(2^d, 2^d, 2^d)$ where d is the maximum size of the given point cloud along the x, y, or z direction. All point cloud points may be included in this defined cube. A cube may be divided into eight sub-cubes, which creates the octree structure allowing one parent to have 8 children, and an octree structure may then be built by recursively subdividing sub-cubes. An 8-bit code may be generated by associating a 1-bit value with each sub-cube to indicate whether it contains points (i.e., full and has value 1) or not (i.e., empty and has value 0). Only full sub-cubes with a size greater than 1 (i.e., non-voxels) may be further subdivided. The geometry information (x, y, z) for one position may be represented by this defined octree structure. Since points may be duplicated, multiple points may be mapped to the same sub-cube of size 1 (i.e., the same voxel). In order to handle such a situation, the number of points for each sub-cube of dimension 1 is also arithmetically encoded. By construction of the octree, a current cube associated with a current node may be surrounded by six cubes of the same depth sharing a face with it. Depending on the location of the current cube, one cube may have up to six same-sized cubes to share one face. In addition, the current cube may also have some neighboring cubes which share lines or points with the current cube.

Referring back to FIG. 3, as to attribute encoding, optionally, color transform module 310 may be configured to convert red/green/blue (RGB) color attributes of each point to YCbCr color attributes if the attributes include color. Attribute transform module 312 may be configured to perform attribute transformation based on the results from geometry analysis module 306 (e.g., using the octree scheme), including but not limited to, the region adaptive hierarchical transform (RAHT), interpolation-based hierarchical nearest-neighbor prediction (predicting transform), and interpolation-based hierarchical nearest-neighbor prediction with an update/lifting step (lifting transform). Optionally, quantization module 314 may be configured to quantize the transformed coefficients of attributes from attribute transform module 312 to generate quantization levels of the attributes associated with each point to reduce the dynamic range. Arithmetic encoding module 316 may be configured to arithmetically encode the resulting transformed coefficients of attributes associated with each point or the quantization levels thereof into the attribute bitstream.

In some embodiments, a prediction may be formed from neighboring coded attributes, for example, in predicting transform and lifting transform by attribute transform module 312. Then, the difference between the current attribute and the prediction may be coded. According to some aspects of the present disclosure, in the AVS G-PCC standard, after the geometry positions are coded, a Morton code or Hilbert code may be used to convert a point cloud in a 3D space (e.g., a point cloud cube) into a 1D array. Each position in the cube will have a corresponding Morton or Hilbert code, but some positions may not have any corresponding point cloud attribute. In other words, some positions may be empty. The attribute coding may follow the predefined Morton order or Hilbert order. A predictor may be generated from the previous coded points in the 1D array following the Morton order or Hilbert order. The attribute difference between the current point and its prediction points may be encoded into the bitstream. In some embodiments, the point cloud in the 3D space (e.g., a point cloud cube) is converted into a 1D array without any pre-defined order, but instead in its native input order, for example, the order in which the point cloud data is collected. That is, in some examples, the attribute coding may follow the native input order of the point cloud, instead of the predefined Morton order or Hilbert order. In other words, the order followed by the points in the 1D array may be either a Morton order, a Hilbert order, or the native input order.

Figure 4:
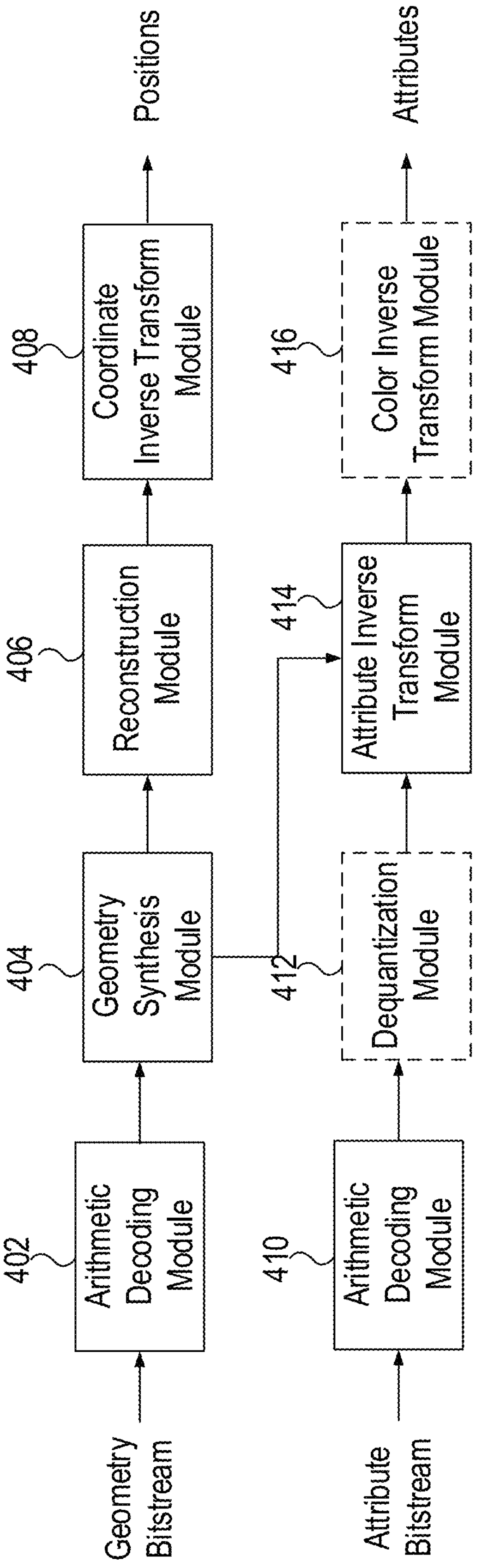
FIG. 4 illustrates a detailed block diagram of an exemplary decoder in the decoding system in FIG. 2, according to some embodiments of the present disclosure.

FIG. 4 illustrates a detailed block diagram of exemplary decoder 201 in decoding system 200 in FIG. 2, according to some embodiments of the present disclosure. As shown in FIG. 4, decoder 201 may include an arithmetic decoding module 402, a geometry synthesis module 404, a reconstruction module 406, and a coordinate inverse transform module 408, together configured to decode positions associated with points of a point cloud from the geometry bitstream (i.e., geometry decoding). As shown in FIG. 4, decoder 201 may also include an arithmetic decoding module 410, a dequantization module 412, an attribute inverse transform module 414, and a color inverse transform module 416, together configured to decode attributes associated with points of a point cloud from the attribute bitstream (i.e., attribute decoding). It is understood that each of the elements shown in FIG. 4 is independently shown to represent characteristic functions different from each other in a point cloud decoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on decoder 201. It is still further understood that the modules shown in FIG. 4 are for illustrative purposes only, and in some examples, different modules may be included in decoder 201 for point cloud decoding.

When a point cloud bitstream (e.g., a geometry bitstream or an attribute bitstream) is input from a point cloud encoder (e.g., encoder 101), the input bitstream may be decoded by decoder 201 in a procedure opposite to that of the point cloud encoder. Thus, the details of decoding that are described above with respect to encoding may be skipped for ease of description. Arithmetic decoding modules 402 and 410 may be configured to decode the geometry bitstream and attribute bitstream, respectively, to obtain various information encoded into the bitstream. For example, arithmetic decoding module 410 may decode the attribute bitstream to obtain the attribute information associated with each point, such as the quantization levels or the coefficients of the attributes associated with each point. Optionally, dequantization module 412 may be configured to dequantize the quantization levels of attributes associated with each point to obtain the coefficients of attributes associated with each point. Besides the attribute information, arithmetic decoding module 410 may parse the bitstream to obtain various other information (e.g., in the form of syntax elements), such as the syntax element indicative of the order followed by the points in the 1D array for attribute coding.

Inverse attribute transform module 414 may be configured to perform inverse attribute transformation, such as inverse RAHT, inverse predicting transform, or inverse lifting transform, to transform the data from the transform domain (e.g., coefficients) back to the attribute domain (e.g., luma and/or chroma information for color attributes). Optionally, color inverse transform module 416 may be configured to convert YCbCr color attributes to RGB color attributes.

As to the geometry decoding, geometry synthesis module 404, reconstruction module 406, and coordinate inverse transform module 408 of decoder 201 may be configured to perform the inverse operations of geometry analysis module 306, voxelization module 304, and coordinate transform module 302 of encoder 101, respectively.

Consistent with the scope of the present disclosure, encoder 101 and decoder 201 may be configured to adopt various novel schemes of syntax element representation and organization, as disclosed herein, to improve the flexibility and generality of point cloud coding.

Some existing techniques apply a two-stage encoding procedure to encode geometry information. First, the geometry is decimated to create a base mesh encoded using generic geometry-coding method, e.g., "edgebreaker." Then, the base mesh is hierarchically subdivided, and the difference between the subdivided point and the approximation of the original mesh is stored as the geometry displacements component. The displacement components are packed into a two-dimensional (2D) image and encoded with lossless video coding. A high-level diagram of the two-stage geometry-coding process 500 is described below in connection with FIG. 5.

Figure 5:
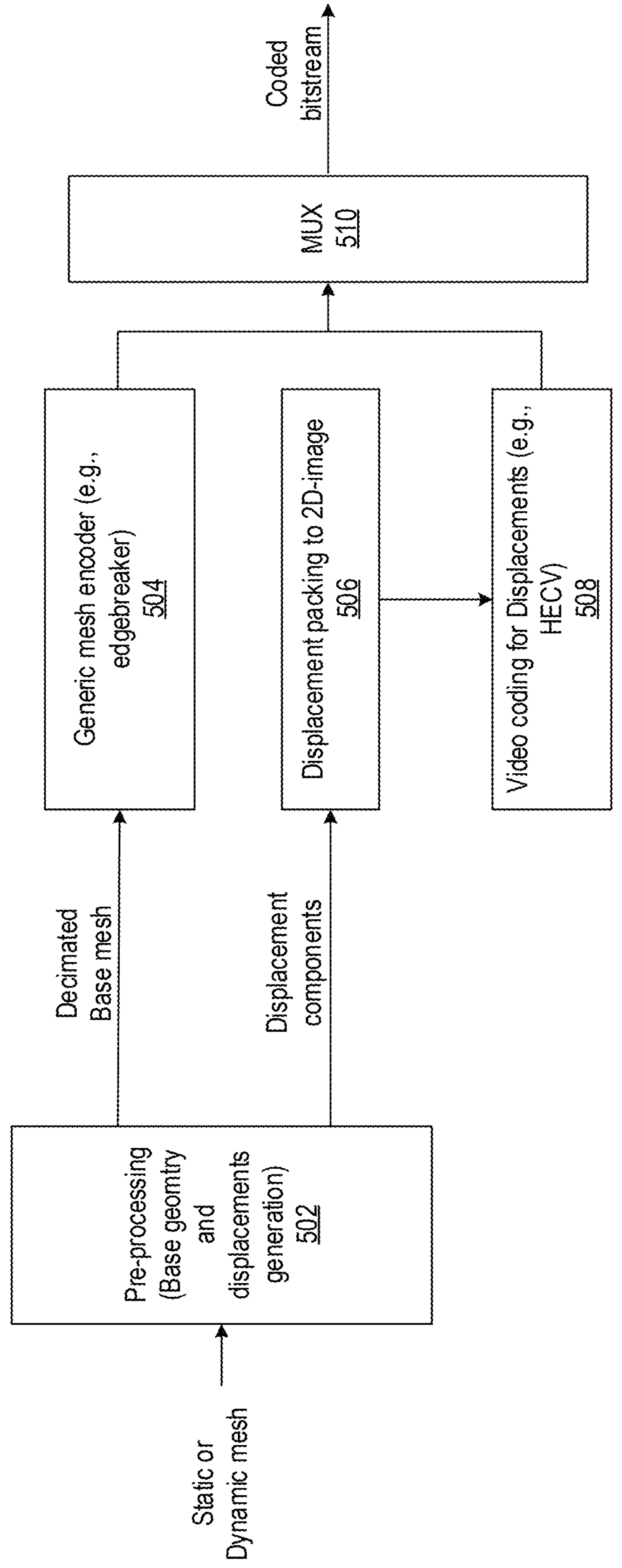
FIG. 5 illustrates a block diagram of a geometry-coding process implemented by an encoder, according to some embodiments of the present disclosure.

Referring to FIG. 5, an encoder may receive a static or dynamic mesh of a video, picture, frame, scene, etc. At 502, the encoder may perform pre-processing to generate a base-mesh geometry and mesh displacements. The base-mesh geometry may include a decimated base mesh with a fewer number of points than the static or dynamic mesh that was originally received. The decimated base mesh may be input to a mesh encoder 504 that implements, e.g., an edgebreaker encoding process. The mesh encoder may perform geometry encoding of the decimated base mesh. On the other hand, the mesh displacements may be input to a displacements-packing component 506. The displacements-packing component 506 may perform displacements packing to a 2D image, as described below in connection with FIGS. 6A-6C. The displacements packing information may be input to a video coder 508 for displacements, e.g., such as an HEVC component. Mesh encoder 504 and video coder 508 may input their respective information to a multiplexer (MUX) 510, which encodes the information into a bitstream.

Figure 6A:
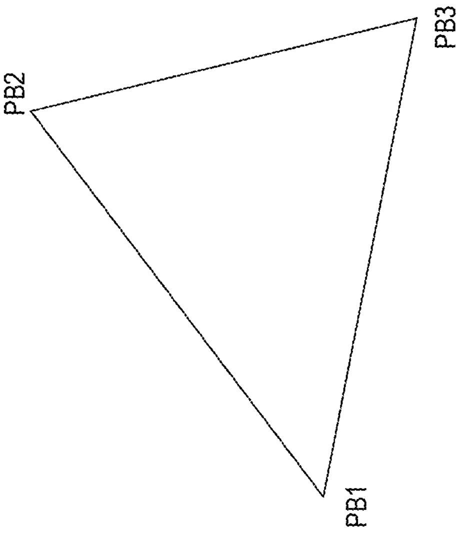
FIGS. 6A-6C illustrates a mesh subdivision and mesh displacement approximation process implemented by an encoder, according to some embodiments of the present disclosure.
Figure 6B:
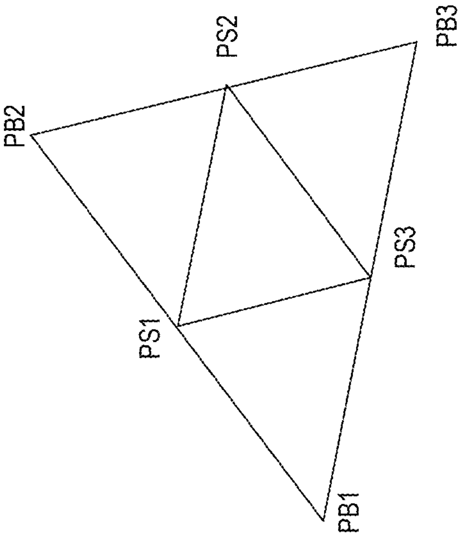
Figure 6C:
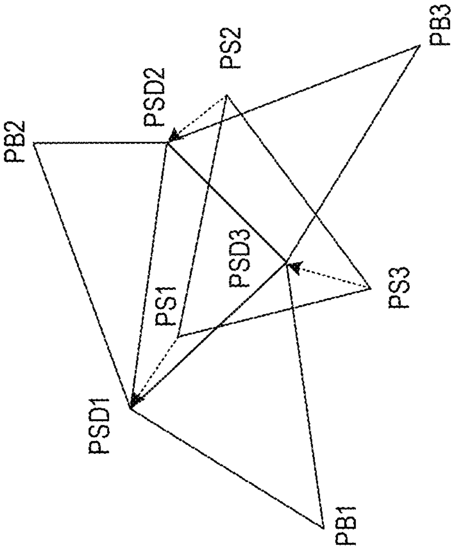
Figure 6D:
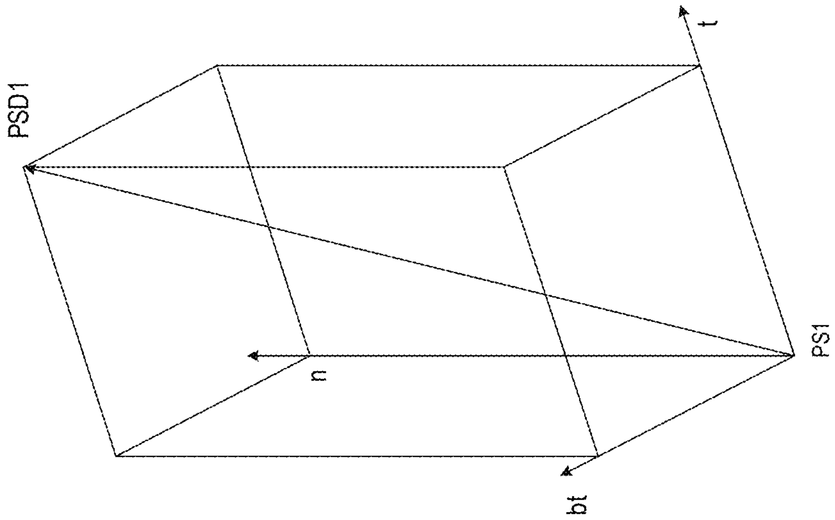
FIG. 6D illustrates a displacement component decomposition in a local coordinate system, according to some embodiments of the present disclosure.

FIGS. 6A-6C illustrates a mesh subdivision and mesh displacement approximation process 600, 625, 650 implemented by a displacements-packing component of an encoder, according to some embodiments of the present disclosure. In FIGS. 6A-6C, this process is illustrated for once face in a base mesh. FIG. 6D illustrates a displacement component decomposition 675 in a local coordinate system, according to some embodiments of the present disclosure.

Referring to FIG. 6A, PB1, PB2, and PB3 denote the base mesh points. PS1, PS2, and PS3, in FIG. 6B, represent subdivided points. PSD1, PSD2, and PSD3 represent subdivided displaced points, as shown in FIG. 6C. Subdivided point PS1 may be calculated as a mid-point between the PB1 and PB2 points. Then, the process can be recursively repeated. Each vector of PS1 and PSD1 is described as three components in normal, tangent, and bitangent directions that are further mapped to color planes (e.g., Y, U, and V components in YUV 444 color space).

Figure 7:
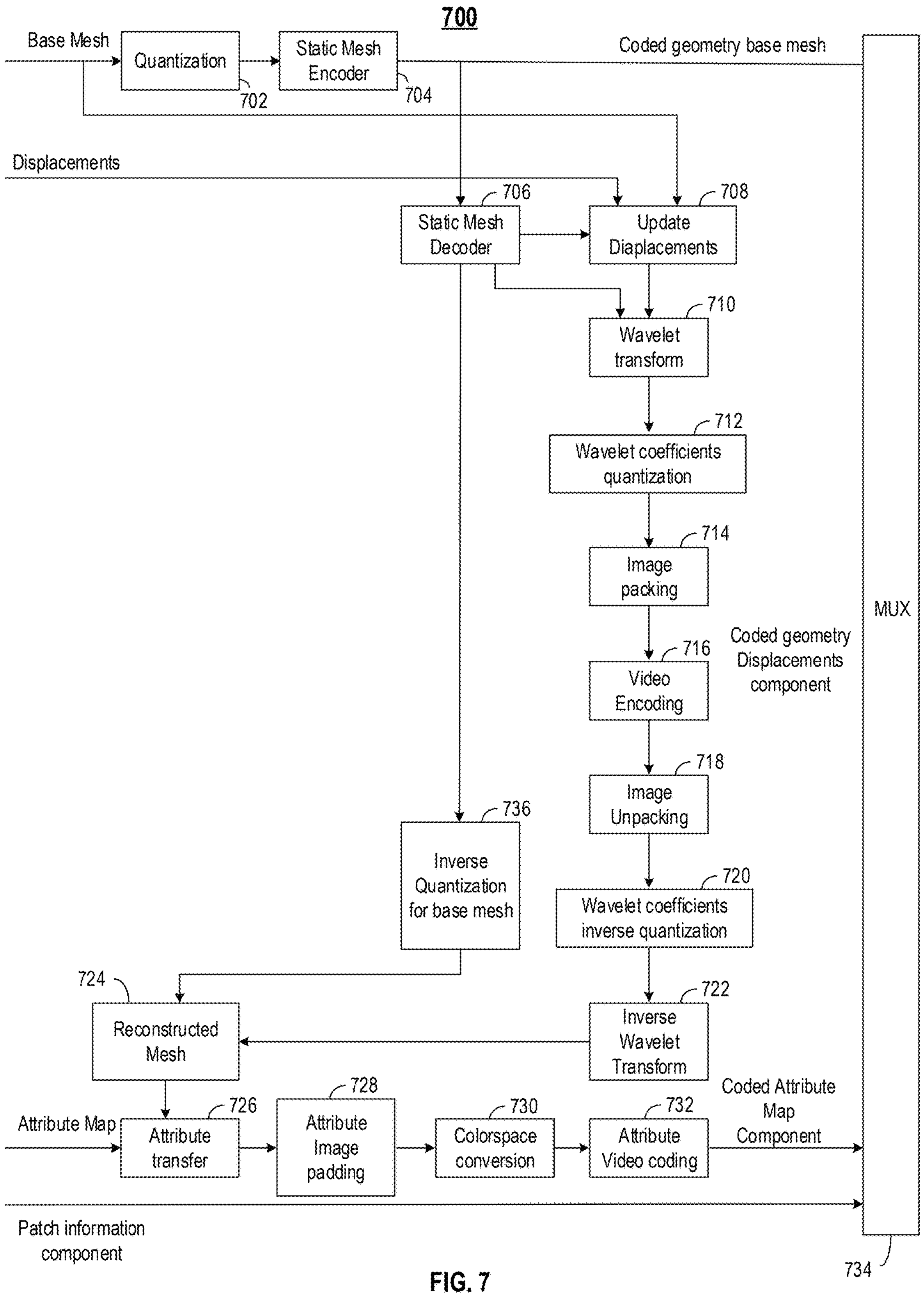
FIG. 7 illustrates a detailed diagram of a parametrized mesh-coding process, according to some embodiments of the present disclosure.

FIG. 7 illustrates a detailed diagram of a parametrized mesh-coding process 700, according to some embodiments of the present disclosure. Referring to FIG. 7, the base mesh frame is quantized by a quantization component 702 and encoded using a static mesh encoder 704. The process is agnostic to the type of mesh encoding scheme used to compress the base mesh.

Mesh displacements may be input to an update-displacements component 708, which updates the displacements based on information received from static mesh decoder 706. This information may be related to the decimated base mesh, for example. Once updated, the mesh displacements may be input to a wavelet-transform component 710. For instance, the mesh displacements may be processed using a hierarchical wavelet transform (or another type of transform) that recursively applies refinement layers to the reconstructed base mesh. The wavelet-transform coefficients are then quantized by wavelet-coefficient quantization component 712. Then, image-packing component 714 may pack the quantized wavelet-transform coefficients into a 2D image/video, which is compressed using a traditional image/video encoder 716.

The reconstructed version of the wavelet-transform coefficients may be generated by image unpacking component 718, which applies image unpacking. Wavelet-coefficient inverse quantization component 720 may perform inverse quantization to the reconstructed wavelet coefficient image/video generated during the image/video decoding process. Reconstructed displacements are then computed by applying the inverse wavelet transform to the reconstructed wavelet by inverse wavelet-transform component 722. The reconstructed wavelet-transform coefficients are input to the reconstructed mesh component 724, along with an inverse quantization of the base mesh from inverse quantization for base mesh component 736. Once the mesh is reconstructed, it may be input to an attribute transfer component 726, along with a preconstructed attribute map. Once the attributes are transferred to the reconstructed mesh, an attribute image padding component 728 may apply image padding to the reconstructed mesh, along with an attribute transfer. Color-space conversion 730 may perform a color space conversion for the attribute map. Then, attribute video-coding component 732 may encode the attribute map. The coded attribute map, patch information, and the coded-geometry base-mesh may be input to multiplexer 734 for input to a bitstream.

Wavelet-transform coefficients are calculated in a floating-point format and can be positive and/or negative. In existing techniques, the coefficients are first converted to positive values and mapped to a given bit-depth to generate a 2D image, using expression (1).

$$c'(i) = 2^\wedge[\text{bit\_depth} - 1] + [c(i) * 2^\wedge\text{bit\_depth}] / [\text{c\_max} - \text{c\_min}], \quad (1)$$

where c'(i) is an integerized displacement coefficient value, c(i) is a current displacement coefficient, c_max is a maximum displacement coefficient value, c_min is a minimum displacement coefficient value, and bit_depth is a value that defines a number of fixed levels for image coding.

Figure 8:
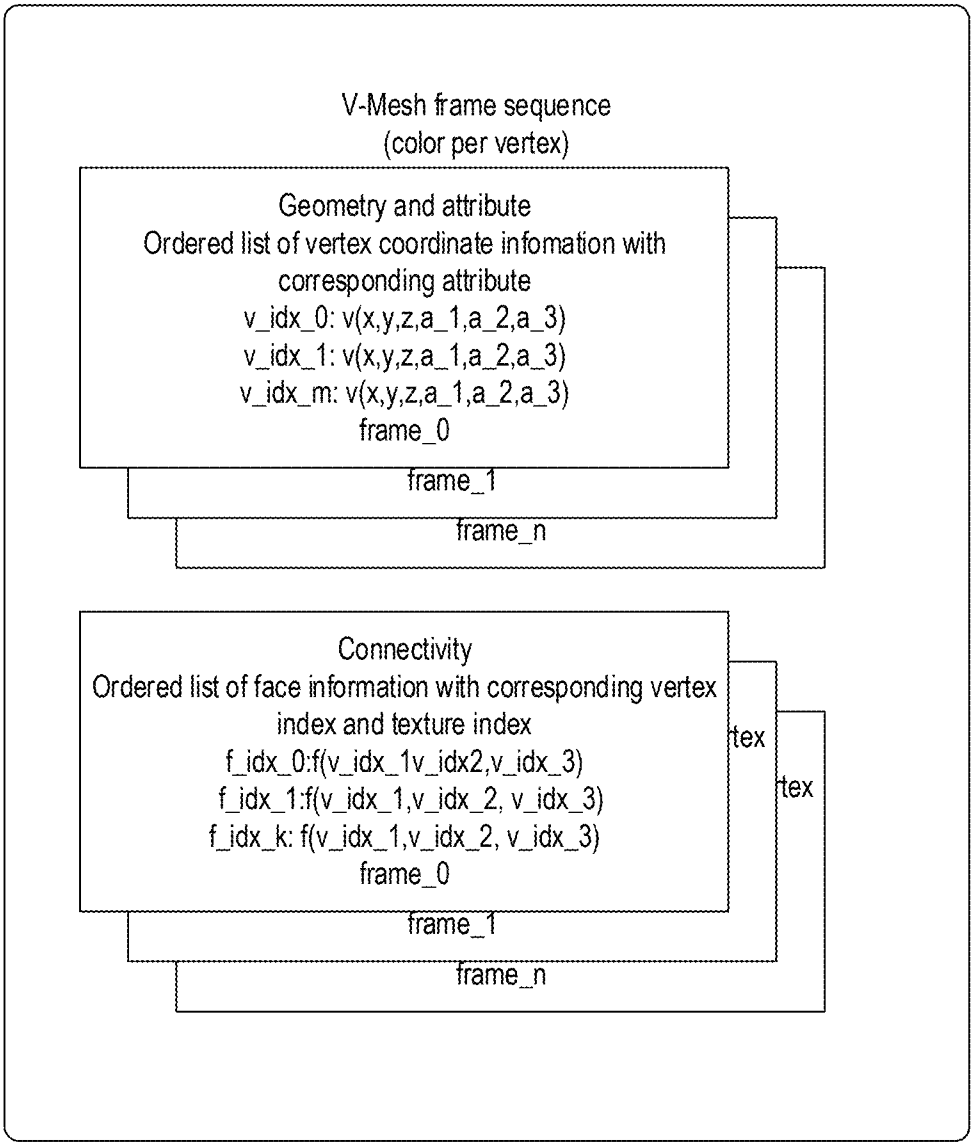
FIG. 8 illustrates a diagram of a mesh data structure, according to some embodiments of the present disclosure.
Figure 9:
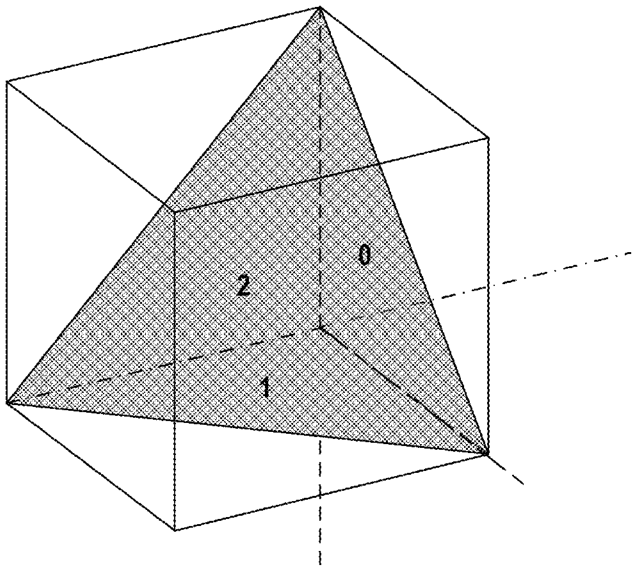
FIG. 9 illustrates a diagram of a mesh with four vertices and three triangular faces, according to some embodiments of the present disclosure.
Figure 10:
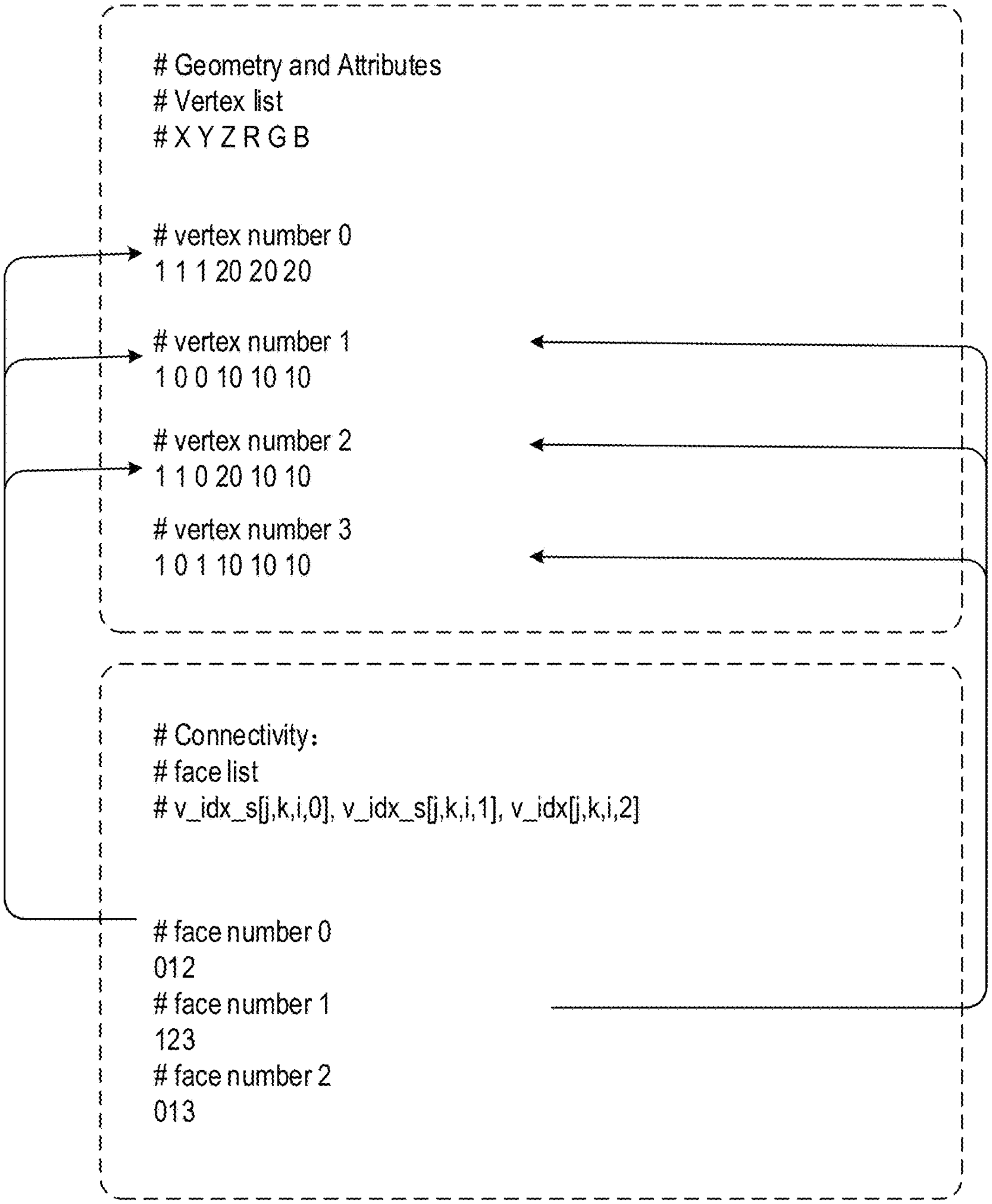
FIG. 10 illustrates a connectivity diagram of a mesh with four vertices and three triangular faces, according to some embodiments of the present disclosure.

An example of geometry information for one mesh frame is depicted in the mesh data structure 800 illustrated in FIG. 8. FIG. 9 illustrates a diagram 900 of a mesh with four vertices and three triangular faces, according to some embodiments of the present disclosure. FIG. 10 illustrates a connectivity diagram 1000 of a mesh with four vertices and three triangular faces, according to some embodiments of the present disclosure.

Referring to FIG. 9, an example of a surface, represented by a mesh with color-per-vertex characteristics, four vertices, and three faces. A position in space describes each vertex by X, Y, Z coordinates and color attributes red (R), green (G), and blue (B). As shown in FIG. 9, each face is defined by three vertex indices that form a triangle. A connectivity diagram of these features is illustrated in FIG. 10.

Figure 11:
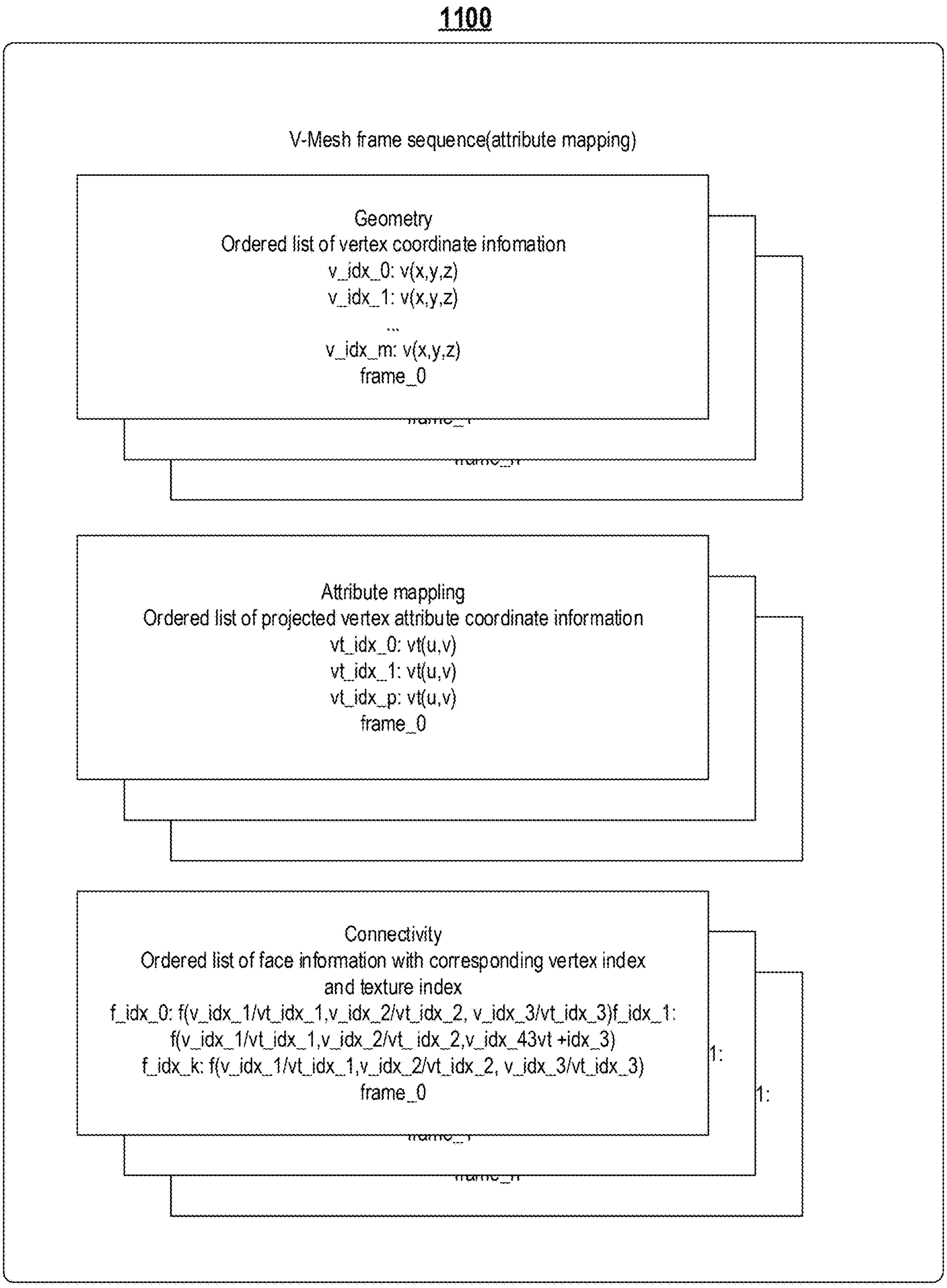
FIG. 11 illustrates a data structure diagram for a parametrized mesh, according to some embodiments of the present disclosure.
Figure 12:
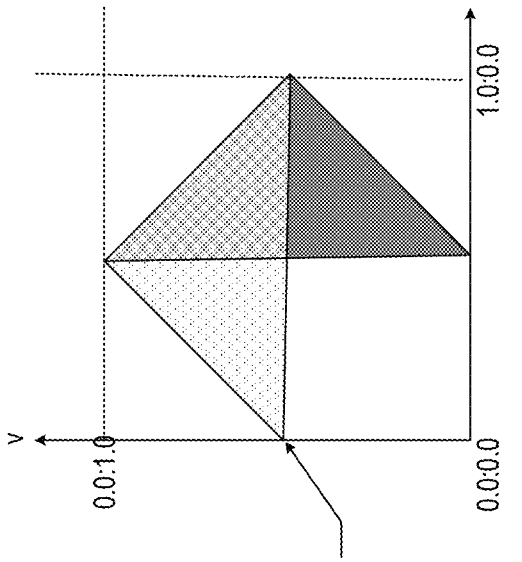
FIG. 12 illustrates a diagram of a mesh with four vertices and three triangular faces and a corresponding attribute map, according to some embodiments of the present disclosure.
Figure 12:
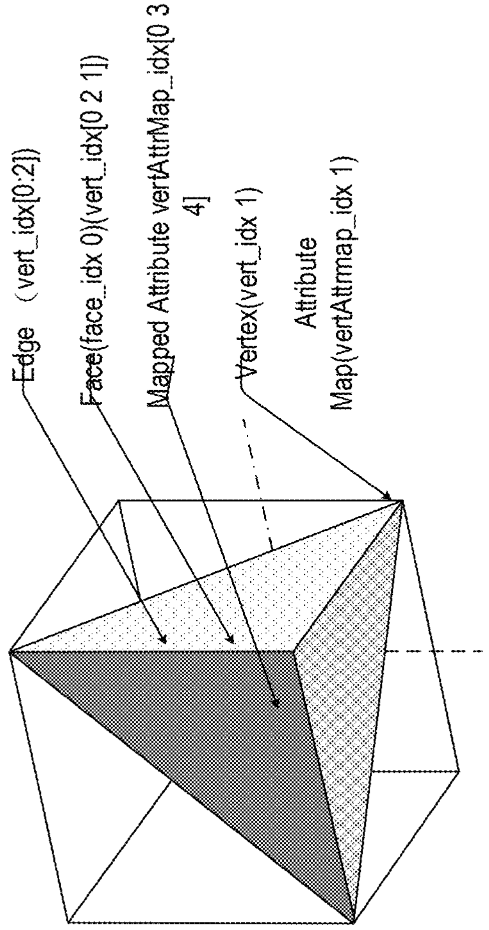

FIG. 11 illustrates a data structure diagram 1100 for a parametrized mesh, according to some embodiments of the present disclosure. FIG. 12 illustrates a diagram 1200 of a mesh with four vertices and three triangular faces and a corresponding attribute map, according to some embodiments of the present disclosure.

An example of a surface, represented by a mesh with attribute mapping characteristics (e.g., FIG. 11) that includes four vertices and three faces is depicted in FIG. 12. A position in space describes each vertex by X, Y, Z coordinates. U and V denote attribute coordinates in the 2D texture vertex map. Each face is defined by three pairs of vertex indices, texture vertex coordinates that forms a triangle in 3D space, and a triangle in the 2D texture map.

Figure 13:
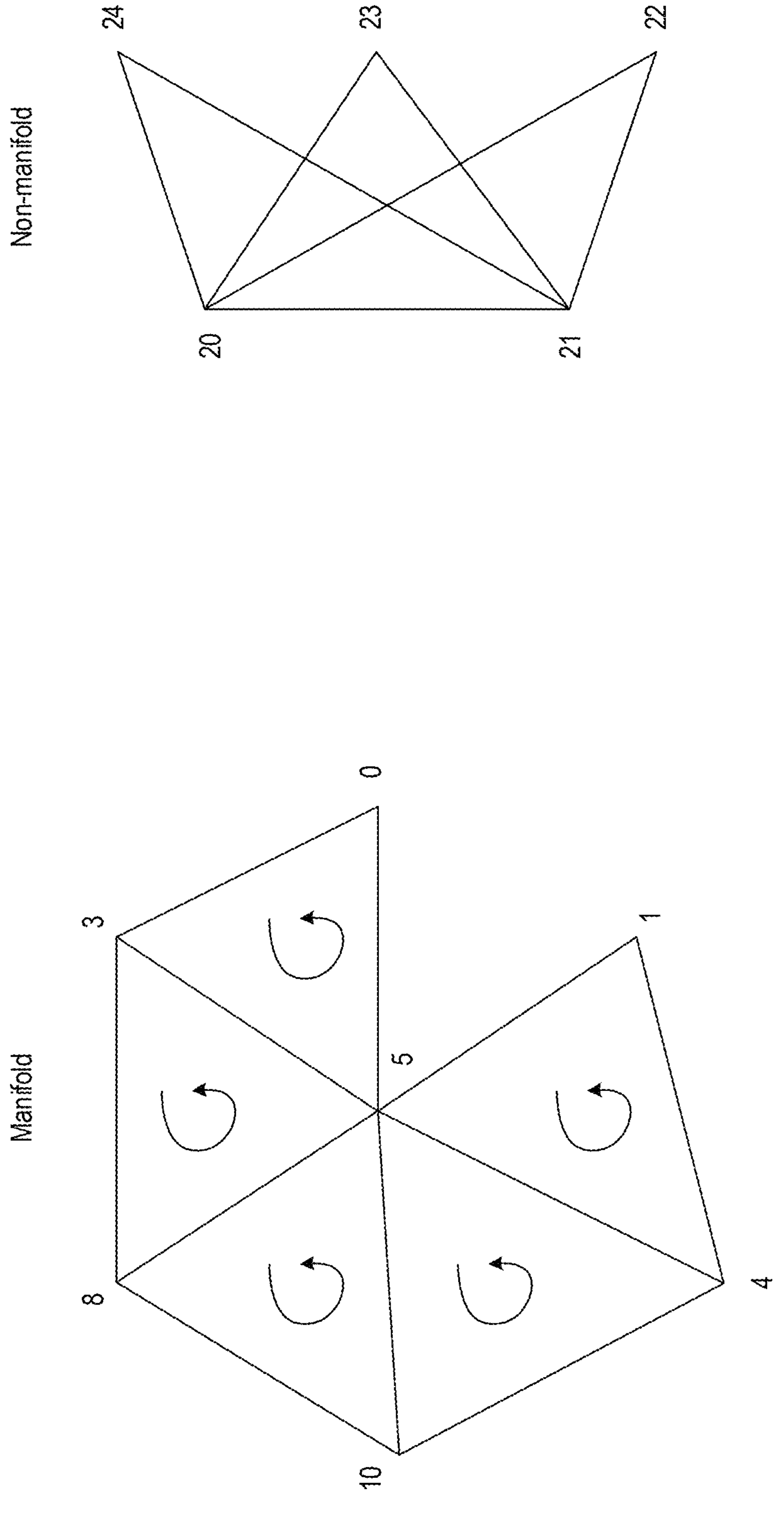
FIG. 13 illustrates a diagram of mesh-face orientation based on vertex-index order, according to some embodiments of the present disclosure.

FIG. 13 illustrates a diagram of mesh-face orientation 1300 based on vertex-index order, according to some embodiments of the present disclosure. Referring to FIG. 13, the orientation of the face is determined using the right-hand coordinate system. The face includes three vertices that belong to three edges, and the three vertex indices describe each face. A manifold mesh is a mesh where one edge belongs to two different faces at most, as shown on the left-hand side of FIG. 13. On the other hand, a non-manifold mesh is a mesh with an edge that belongs to more than two faces, as shown on the right-hand side of FIG. 13.

Unfortunately, the image-packing process for wavelet-transform coefficients in the above-described technique may only start once the first wavelet coefficient is quantized. Moreover, the video encoding process can only begin once the final wavelet coefficient has been packed into a 2D image. This increases the length of the encoding procedure, while at the same time increases the computational complexity of the related operations. The process of mapping 3D displacement coefficients to a 2D surface and further video coding imposes a coding delay and requires additional memory storage.

To overcome these and other challenges, the present disclosure provides an exemplary mesh encoding/decoding technique in which the binarization process can be implemented immediately after quantization of the first wavelet coefficient. In some embodiments, the exemplary mesh encoding/decoding technique may encode/decode the wavelet-transform coefficients using zero-run length coding. The zero-run length coding technique described herein removes the parsing dependency and can be applied immediately after quantizing the first wavelet coefficient. The zero-run length coding may be applied to either encode a value of a symbol, or to encode a number of consecutive zero coefficients along the space scanning curve.

Additional details of the exemplary mesh encoding/decoding techniques are described below in connection with FIGS. 14-22.

Figure 14:
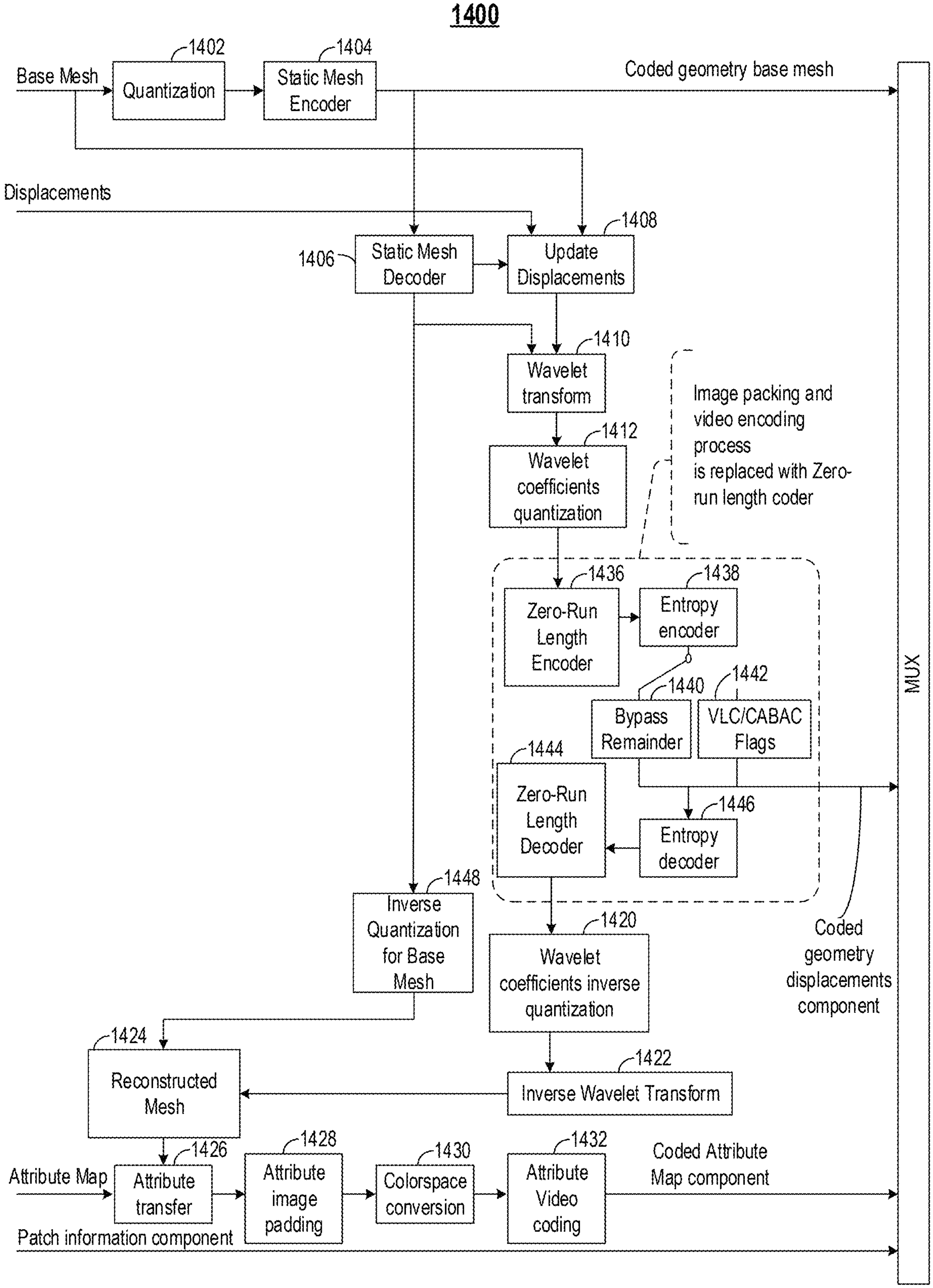
FIG. 14 illustrates a detailed diagram of an exemplary encoder architecture for parametrized mesh coding with zero run-length displacements coding, according to some embodiments of the present disclosure.

FIG. 14 illustrates a detailed diagram of an exemplary encoder architecture 1400 for parametrized mesh coding with zero-run length coding, according to some embodiments of the present disclosure. As illustrated in FIG. 14, rather than using an image/video encoder, the exemplary encoder architecture of the present disclosure applies zero-run length coding with further entropy coding.

During pre-processing (not illustrated in FIG. 14), mesh segmentation may be applied to a mesh to create segments or blocks of mesh content representing individual objects/regions of interest/volumetric tiles, semantic blocks, etc. Then, mesh decimation may be performed to generate a base mesh, and the base mesh is coded with an undefined static mesh encoder. The base mesh may be decoded and recursively subdivided to the level defined by the encoder, as described below. In another pre-processing operation, mesh displacements may be calculated between the subdivided mesh and the original surface for each level of transform. The displacements are processed with a wavelet transform, as described below.

Referring to the operations of FIG. 14, the base mesh may be quantized by a quantization component 1402 and encoded using a static mesh encoder 1404. These operations are agnostic to the type of mesh encoding scheme used to compress the base mesh. Mesh displacements may be input to an update-displacements component 1408, which updates the displacements based on information received from static mesh decoder 1406. This information may be related to the decimated base mesh, for example. Mesh displacements may be calculated for each LoD according to the coding mode (see FIGS. 15A-15C) used for a sequence of frames or a frame that follows the sequence of frames. For instance, when the same LoD is used to code a sequence of frames a displacement sequence parameter set (dmsps) syntax element may be input to, e.g., static mesh decoder 1406. The dmsps syntax element may include a dmsps_mesh_LoD_coding_mode[i] syntax element, where i represents the index of the level of detail with a specified coding mode (e.g., coding mode 0, coding mode 1, or coding mode 2) used to generate the set of mesh displacements for the sequence of frames. This means that each LoD may have its own coding mode. For example, for LoD[0], coding mode2 may be used; for LoD[1], coding mode 1 may be used; for LoD[3], LoD[4], and LoD[5], coding mode 0 may be used; and for LoD[6], coding mode 2 may be used. According to aspects of the present disclosure, there is no restriction on subsequent coding modes being "simpler," or constrained by simultaneous coding-mode application. On the other hand, when a frame that follows the sequence of frames is associated with a different coding mode, a displacement picture parameter set (dmpps) syntax element may be input to static mesh decoder 1406. For instance, the dmpps syntax element may include a dmpps_mesh_LoD_coding_mode[i] syntax element, where i represents the index of the level of details iteration that coding mode used to generate the set of mesh displacements for the frame that follows the sequence of frames. Additional details of the various syntax elements used to indicate the coding mode and/or LoD are provided below.

Updated-displacements component 1408 may calculate mesh displacements between the subdivided mesh and the original surface for each LoD. For skip mode, no mesh displacements are encoded in the bitstream. Once updated, the mesh displacements may be input to a wavelet-transform component 1410. The mesh displacements may be processed by a hierarchical wavelet transform (or another transform) that recursively applies refinement layers to the reconstructed base mesh. The wavelet-transform coefficients may be quantized by wavelet-coefficient quantization component 1412. For simple mode, the mesh displacement n (e.g., normal-vector component) are processed with a wavelet transform. For full mode, the mesh displacements n, t, bt (e.g., normal-vector component, tangent-vector component, and bitangent-vector component) are processed with a wavelet transform.

Figure 17A:
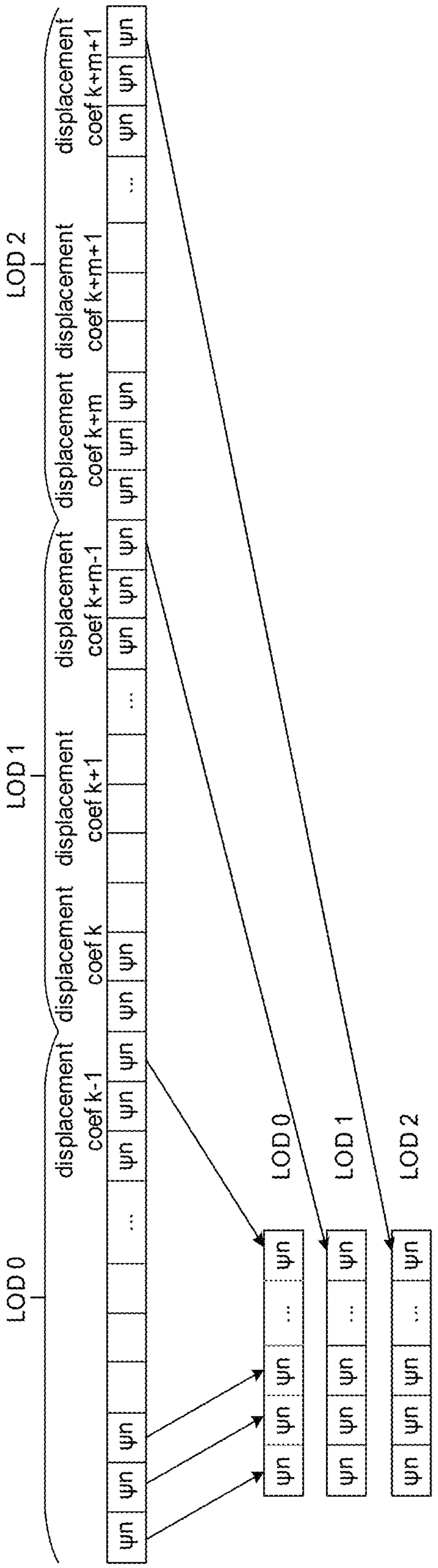
FIG. 17A illustrates a first exemplary level-of-detail (LoD)-based data representation associated with a simple-coding mode, according to some embodiments of the present disclosure.
Figure 17B:
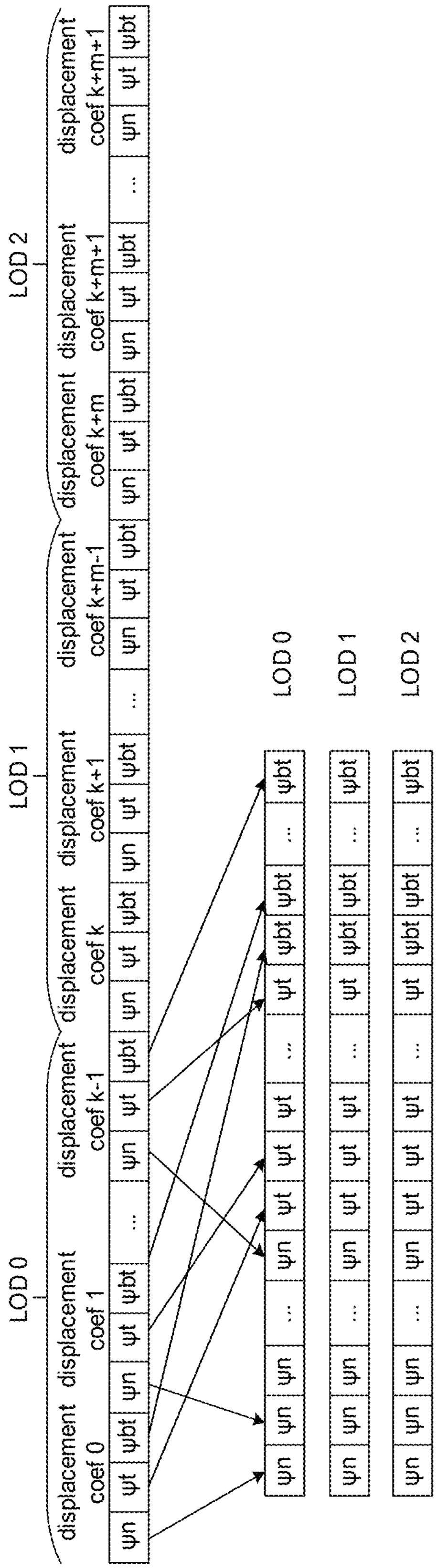
FIG. 17B illustrates a second exemplary LoD-based data representation associated with a full-coding mode, according to some embodiments of the present disclosure.

Quantized wavelet-transform coefficients Ψn, Ψt, and Ψbt are converted to a fix-point representation with a precision indicated in the coded bitstream at either slice, picture, or sequence level. The quantized wavelet-transform coefficients if present Ψn, Ψt, and Ψbt are scanned along 3D space scanning pattern (e.g., Morton, Hilbert, or other order). The wavelet-transform coefficients are analyzed and the last non-zero coefficient for each LoD and the vector component(s) are encoded in the bitstream as dmh_last_significant_coef as depicted in FIGS. 17A and 17B.

It should be noted that the wavelet transform is a hierarchical multiresolution transform. Hence, the statistical characteristics of the vector components may vary for different levels of the wavelet transform. The transformed normal, tangent and bitangent vector components may have different distribution characteristics as well. Since each transform coefficient represents 3D data, each of the vector components may be processed in a predefined order within each level of details.

A zero-run length encoder 1436 may scan the quantized wavelet-transform coefficients along a 3D-space scanning pattern (e.g., Morton, Hilbert, or other order) within each LoD forming three 1-dimensional arrays per each component (see FIGS. 17A and 17B) before conversion to a zero-run length code. The corresponding zero-runs and non-zero coefficients may be encoded as described below in connection in FIGS. 18 and 19A-19C. The zero-run length code is input to entropy encoder 1438 for entropy encoding. The zero-run length code may be encoded by entropy encoder 1438 using a bypass encoder 1440 (e.g., remainder encoder) or a context-adaptive encoder 1442 (e.g., flags encoder). Context-adaptive encoder 1442 may include a CAVLC or a CABAC.

The entropy encoded zero-run length code may be input to entropy decoder 1446. Entropy decoder 1446 may include a bypass or context adaptive decoder, which may apply entropy decoding to the zero-run length code. Zero-run length decoder 1444 may apply inverse quantization to the reconstructed wavelet-coefficient image/video generated during the image/video decoding operations. Wavelet-coefficient inverse quantization component 1420 may perform an inverse quantization, the output of which is sent to inverse wavelet-transform component 1422. Inverse wavelet-transform component 1422 may generate reconstructed mesh displacements by applying an inverse wavelet-transform to the inverse-quantized wavelet-transform coefficients (e.g., reconstructed wavelet-transform coefficients). The reconstructed wavelet-transform coefficients are input to the reconstructed mesh component 1424, along with an inverse quantization of the base mesh from inverse quantization for base mesh component 1448.

Static mesh decoder 1406 may decode the base mesh from the coded-geometry bit-stream output by static mesh encoder 1404. Once decoded, static mesh decoder 1406 may recursively subdivide the base mesh to the level defined by static mesh encoder 1404. Inverse-quantization for base mesh component 1448 may remove quantization from the base mesh. For instance, reconstructed mesh component 1424 may apply the mesh displacements to the subdivided base mesh at each level of transform recursively to generate the reconstructed mesh consisting of blocks representing individual objects/regions of interest/volumetric tiles, semantic blocks, etc.

The de-quantized base mesh may then be input to reconstructed mesh component 1424. The reconstructed mesh may be input to an attribute transfer component 1426, along with a preconstructed attribute map. Once the attributes are transferred to the reconstructed mesh, an attribute image padding component 1428 may apply image padded to the reconstructed mesh with attribute transfer. Colorspace conversion 1430 may perform a color space conversion for the attribute map. Then, attribute video-coding component 1432 may encode the attribute map. The coded attribute map, patch information, and the coded-geometry base-mesh may be input to multiplexer 1434 for input to a bitstream.

Figure 15A:
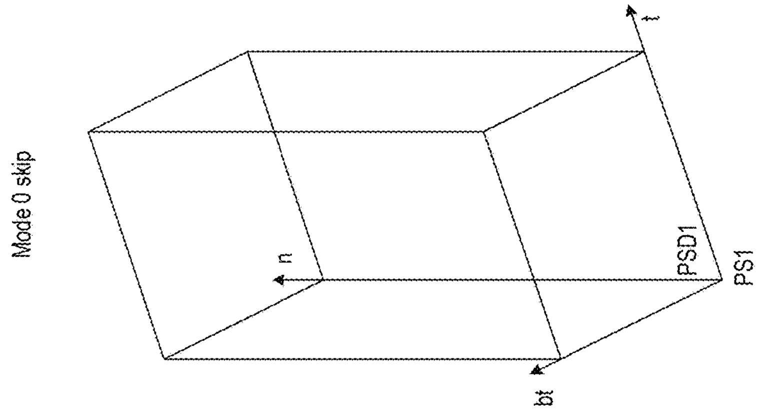
FIGS. 15A-15C illustrate an exemplary displacement coding mode employed by an encoder, according to some embodiments of the present disclosure.
Figure 15B:
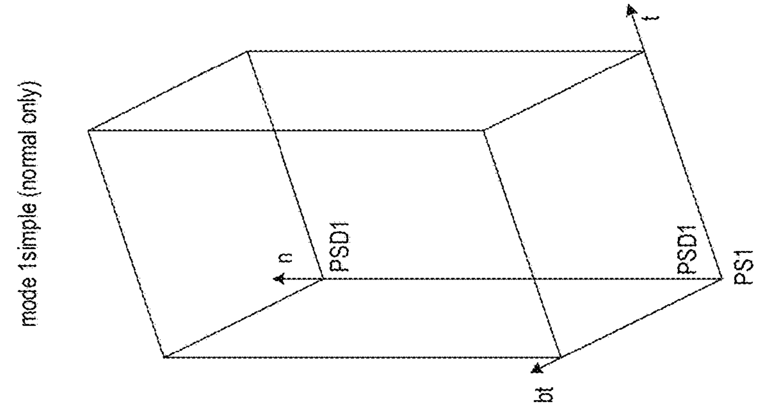
Figure 15C:
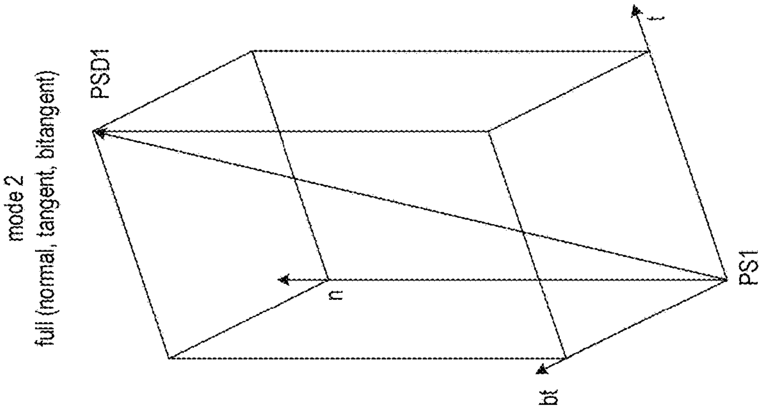
Figure 16A:
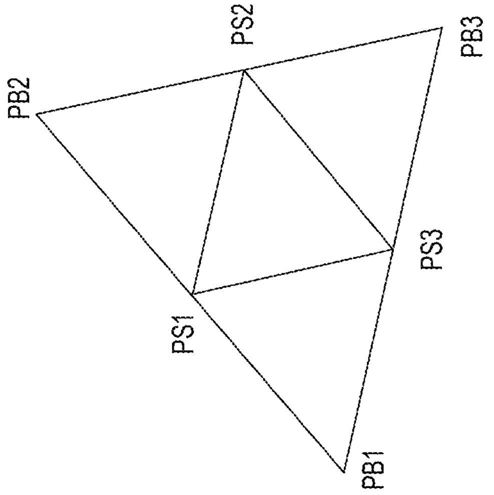
FIGS. 16A-16C illustrate an exemplary face reconstruction technique using various displacement component coding modes, according to some embodiments of the present disclosure.
Figure 16B:
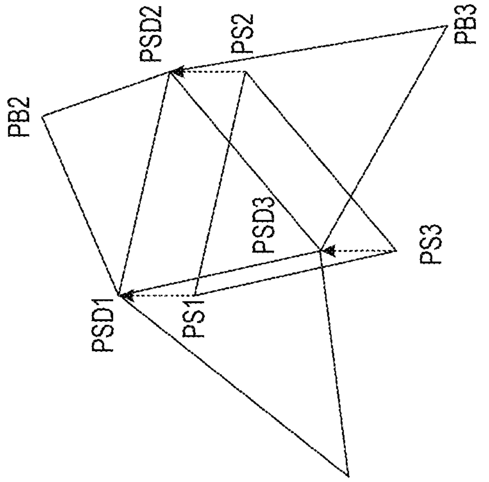
Figure 16C:
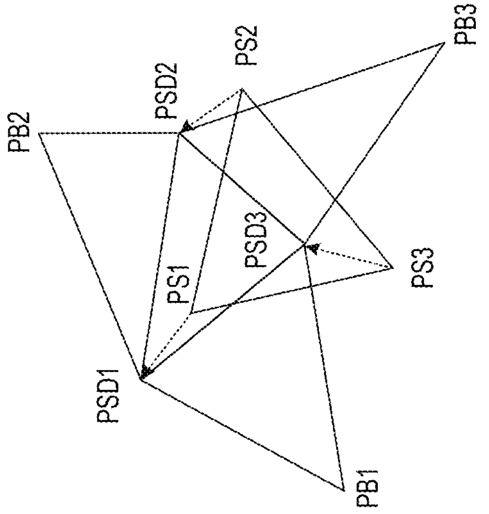

FIGS. 15A-15C illustrate an exemplary displacement coding mode 1500, 1525, 1550 employed by an encoder, according to some embodiments of the present disclosure. FIGS. 16A-16C illustrate an exemplary face reconstruction technique using various displacement component coding modes 1600, 1625, 1650, according to some embodiments of the present disclosure. FIG. 17A illustrates a first exemplary level-of-detail (LoD)-based data representation 1700 associated with a simple-coding mode, according to some embodiments of the present disclosure. FIG. 17B illustrates a second exemplary LoD-based data representation 1725 associated with a full-coding mode, according to some embodiments of the present disclosure.

Referring to FIGS. 15A-15C, the face subdivision process may be implemented using one of several coding modes, depending on the content of the original mesh content. Applying different coding modes may accommodate the different mesh-topologies and corresponding complexity of the mapping. For instance, referring to FIG. 15A, a skip mode (e.g., mode 0) may skip mesh displacement. A simple mode (e.g., coding mode 1) is illustrated in FIG. 15B, and may include a normal-vector component only. FIG. 15C depicts a full mode (e.g., coding mode 2) that generates mesh displacements with a normal-vector component (n), a tangent-vector component (t), and a bitangent-vector component (bt).

Referring to FIGS. 16A-16C, an example of adaptive reconstruction of one face, which is represented by the triangle of PB1, PB2, and PB3 is provided. The subdivision vertexes PBS1, PBS2, and PBS3 in the skip mode are placed directly on the corresponding edge of the base mesh face. In the simple mode, only normal-vector component displacement is applied to adjust the position of the subdivision vertexes, in the full mode all three components are applied to the subdivision process.

Referring to FIGS. 17A and 17B, using such an approach each LoD is indicated in the coded displacements component bitstream. At the decoder stage, a partial reconstruction up to a desired LoD can be achieved based on the following Tables and syntax elements.

TABLE 1

| | Descriptor |
|---|---|
| dmesh_sequence_parameter_set_rbsp( ) { | |
| dmsps_sequence_parameter_set_id | u(4) |
| dmesh_profile_tier_level( ) | |
| ... | |
| dmsps_mesh_LoD_count_minus_1 | u(3) |
| for( i = 0; i < dmsps_mesh_LoD_countminus_1 + 1; i++ ) { | |
| dmsps_mesh_LoD_coding_mode[ i ] | u(3) |
| } | |
| ... | |
| rbsp_trailing_bits( ) | |
| } | |

Referring to Table 1, dmsps_mesh_LoD_count_minus_1 plus one indicates the number of levels of details for the displacement mesh sub-bitstream dmsps_mesh_LoD_coding_mode[i] indicates the coding mode used for displacement coefficients coding at LoD with index i for the displacement sequence. When not present the dmsps_mesh_LoD_coding_mode is inferred to be equal to 2.

TABLE 2

| i | dmsps__mesh__LoD__coding__mode[ i ] |
|---|---|
| 0 | Skip |
| 1 | Simple |
| 2 | Full |
| 3-7 | Reserved |

TABLE 3

| | Descriptor |
|---|---|
| dmesh_picture_parameter_set_rbsp( ) { | |
| dmpps_picture_parameter_set_id | u(4) |
| ... | |
| dmpps_mesh_LoD_count_override_flag | u(1) |
| if ( dmpps_mesh_LoD_count_override == 1) { | |
| dmpps_mesh_LoD_count_minus_1 | u(3) |
| for( i = 0; i < dmsps_mesh_LoD_countminus_1 + 1; i++ ) { | |
| dmpps_mesh_LoD_coding_mode[ i ] | u(3) |
| } | |
| } | |
| ... | |
| rbsp_trailing_bits( ) | |
| } | |

Referring to Table 3, the dmpps_mesh_LoD_count_override_flag syntax element may indicate that the number of LoD levels is different for the current frame and the sequence.

The dmpps_mesh_LoD_count_minus_1 plus one syntax element may indicate the number of levels of details for the current displacement mesh picture.

The dmpps_mesh_LoD_coding_mode[i] syntax element may indicate the coding mode used for displacement coefficients coding at LoD with index I for the current picture. When not present, the dmpps_mesh_LoD_coding_mode is inferred to be equal to 2.

TABLE 4

| i | dmpps__mesh__LoD__coding__mode[ i ] |
|---|---|
| 0 | Skip |
| 1 | Simple |
| 2 | Full |
| 3-7 | Reserved |

TABLE 5

| | Descriptor |
|---|---|
| dmesh_header( ) { | |
| ... | |
| for( i = 0; i < dmsps_mesh_LoD_count_minus_1 + 1; i++ ) { | |
| for( j = 0; j < dmsps_mesh_components_minus_1 + 1; j++ ) { | |
| dmh_last_significant_coef[ i ][ j ] | ae(v) |
| } | |
| } | |
| ... | |
| rbsp_trailing_bits( ) | |
| } | |

Referring to Table 5, the dmh_last_signifficant_coef[i][j] syntax element may indicate that the last significant coefficient for LoD and component.

Figure 18:
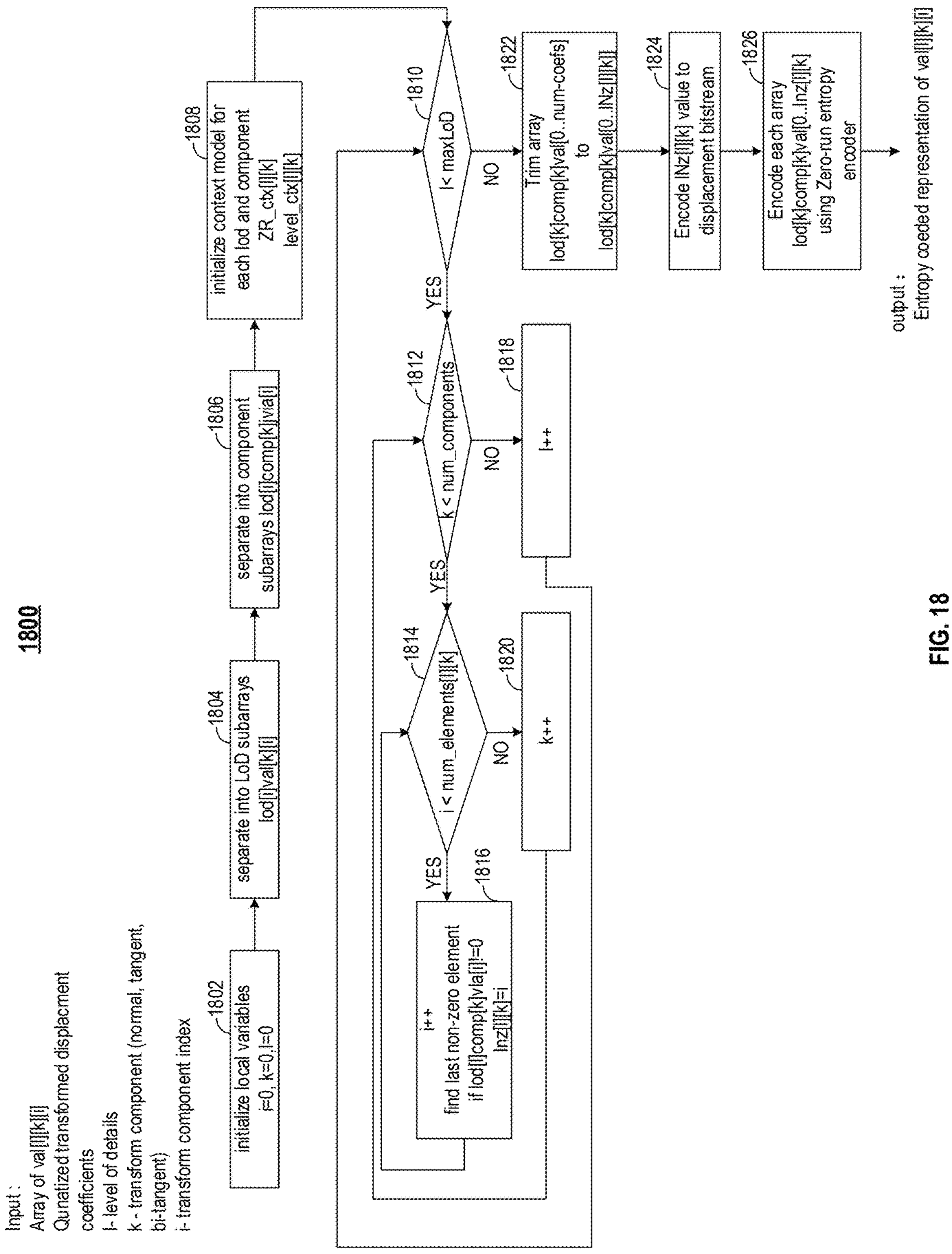
FIG. 18 illustrates an exemplary data reduction with last significant coefficient flow diagram, according to some embodiments of the present disclosure.

FIG. 18 illustrates an exemplary data reduction with last significant coefficient flow diagram 1800, according to some embodiments of the present disclosure. The operations described below may be performed by an apparatus, e.g., such as wavelet-transform component 1410, wavelet-coefficients quantization component 1412, zero-run length encoder 1436, entropy encoder 1438, or any other component described herein or that can be included in the coder architecture of FIG. 14. For ease of description, the following operations will be described in terms of wavelet-coefficient quantization component 1412 and zero-run length encoder 1436, as a non-limiting example. The inputs to wavelet-coefficient quantization component 1412 may include, e.g., an array of wavelet-transform coefficients that includes a plurality of elements. Moreover, as used herein, the first local variable "1" may indicate the LoD, the second local variable "k" may indicate the vector component (e.g., normal-vector component, tangent-vector component, or bitangent-vector component), and the third local variable "i" indicates the index of a wavelet-transform coefficient in the array.

Referring to FIG. 18, at 1802, the apparatus may initialize each of the first, second, and third local variables to a first value. At 1804, the apparatus may separate the LoDs into LoD subarrays (e.g., lod[i]val[k][i]), as illustrated in FIGS. 17 and 17B. At 1806, the apparatus may separate the vector components into vector-component subarrays (e.g., lod[i]comp[k]val[i]). At 1808, the apparatus may initialize the context model (e.g., which is a functionality of an arithmetic encoder) for each LoD and vector component (e.g., ZR_ctx [l][k] and level_ctx[l][k]).

At 1810, the apparatus may determine whether the first value of the first local variable "1" is less than the maximum number of LoDs. If "YES" at 1810, the operations may move to 1812; otherwise, if "NO" at 1810, the operations may move to 1822. At 1812, the apparatus may determine whether the first value of the second local variable "k" is less than the total number of vector components (e.g., 0, 1, or 3, depending on the coding mode). If "YES" at 1812, the operations may move to 1814; otherwise, if "NO" at 1812, the operations may move to 1818, where the apparatus may increment the first value of the first local variable "l" to a second value. At 1814, the apparatus may determine whether the first value of the third local index "i" is less than the total number of quantized wavelet-transform coefficients/elements in the array. If "YES" at 1814, the operations may move to 1816; otherwise, if "NO" at 1816, the operations may move to 1820, where the apparatus may increment the first value of the second local variable "k" to a second value. At 1816, the apparatus may increment the first value of the third local variable "i" to a second value (e.g., i+1) and identify the last non-zero (Lnz) element (e.g., the last non-zero wavelet-transform coefficient) in the array if lod [l]comp[k]val[i]=0 then Lnz[l][k]=i. Then, the operation may return to 1814.

At 1822, the apparatus may reduce the number of elements in the array of wavelet-transform coefficients to a subset of elements based on the Lnz element. For instance, lod[k]comp[k]val[0 . . . num-coefs] may be reduced to lod[k]comp[k]val[0 . . . Lnz[l][k]). At 1824, the apparatus may encode the Lnz [1] [k] value to the bitstream. At 1826, the apparatus may encode each array using a zero-run length entropy encoder, e.g., using the operations described below in connection with FIGS. 19 and/or 20A-20C.

Figure 19A:
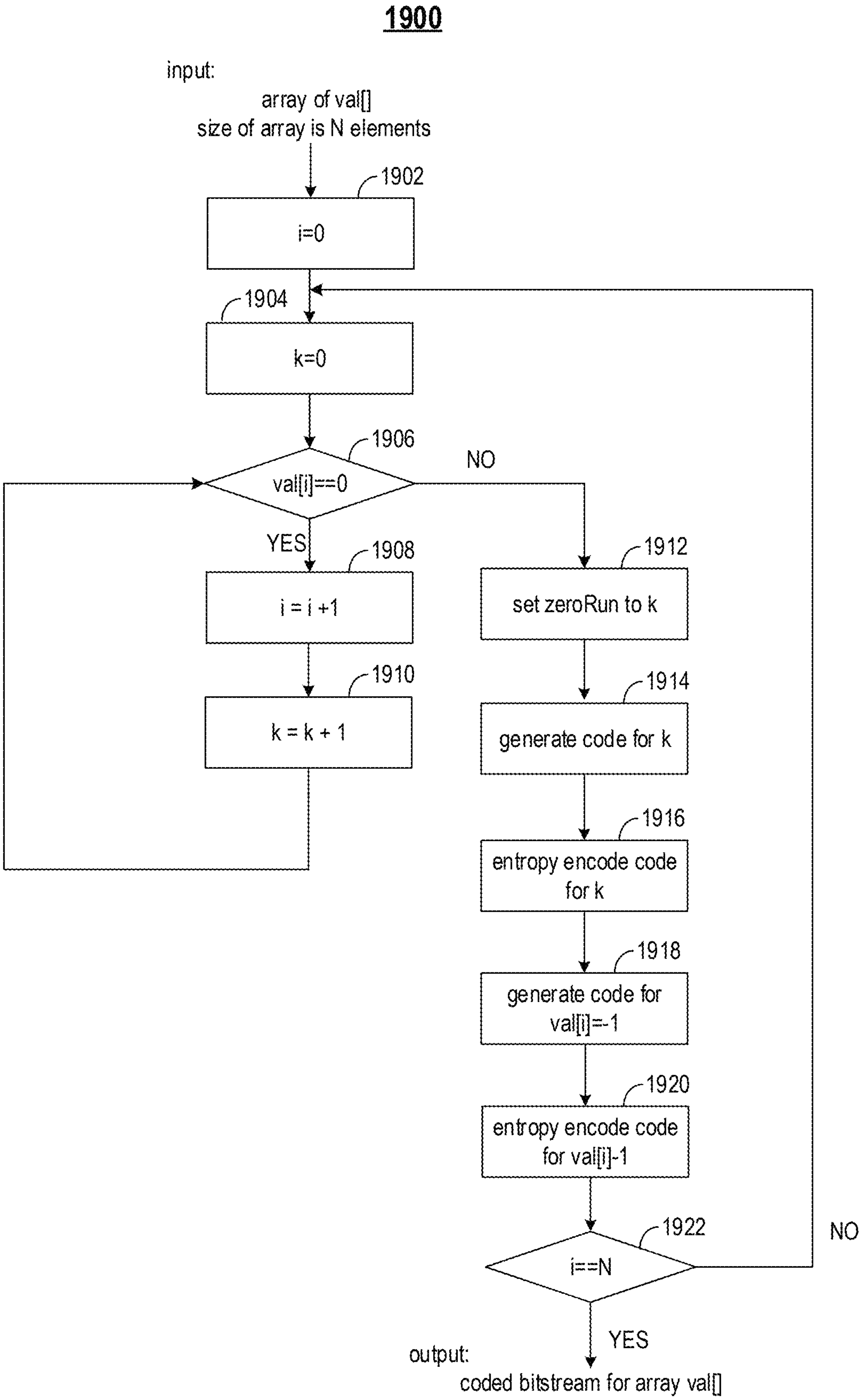
FIG. 19A illustrates an exemplary zero-run length coding flow diagram for quantized coefficients, according to some embodiments of the present disclosure.

FIG. 19A illustrates an exemplary zero-run length coding flow diagram 1900 (referred to hereinafter as "flow diagram 1900") for quantized wavelet-transform coefficients, according to some embodiments of the present disclosure. As mentioned above in connection with FIG. 17, zero-run length encoder 1736 may receive a plurality of quantized wavelet-transform coefficients from wavelet-coefficient quantization component 1712. The plurality of quantized wavelet-transform coefficients may include an array of wavelet-transform coefficient values. The size of the array may include N elements (e.g., N number of wavelet-transform coefficient values). Each of the wavelet-transform coefficient values in the array may be associated with at least one mesh displacement.

Referring to FIG. 19A, at 1902, zero-run length encoder 1736 may initialize a first value of a local variable i. At 1904, zero-run length encoder 1736 may initialize a first value of an external variable k. At 1906, zero-run length encoder 1736 may determine whether the wavelet-transform coefficient value is equal to the first value of the local variable i (e.g., val[i]==0). If "YES" at 1906, the operations may move to 1908; otherwise, if "NO" at 1906, the operations may move to 1912.

At 1908, zero-run length encoder 1736 may increment the first value of the local variable i to a second value (e.g., i+1). At 1910, zero-run length encoder 1736 may increment the first value of the external variable k to a second value (e.g., k+1). Then, the operations may return to 1906, where zero-run length encoder 1736 may determine whether the wavelet-transform coefficient value is equal to the second value of the local variable (e.g., val[i+1]==1).

At 1912, zero-run length encoder 1736 may set the zero-run value associated with the wavelet-transform coefficient value to the first value of the external variable k. At 1914, zero-run length encoder 1736 may generate the zero-run length code for the first value of the external variable k. At 1916, entropy encoder 1738 may entropy encode the zero-run length code for the first value of the external variable k. At 1918, zero-run length encoder 1736 may generate a zero-run length code for the wavelet-transform coefficient value equal to −1 (e.g., val[i]=−1). At 1920, entropy encoder 1738 may entropy encode the zero-run length code for the wavelet-transform coefficient value minus 1. At 1922, zero-run length encoder 1736 may determine whether the first value of the local variable i is equal to the N number of elements in the array of wavelet-transform coefficients. If "YES" at 1922, zero-run length encoder 1736 may encode the zero-run length code for the array of wavelet-transform coefficients into the bitstream; otherwise, if "NO" at 1922, the operations may return to 1904. Additional details of the operations performed by entropy encoder 1738 are provided below in connection with FIGS. 20A-20C.

Figure 20A:
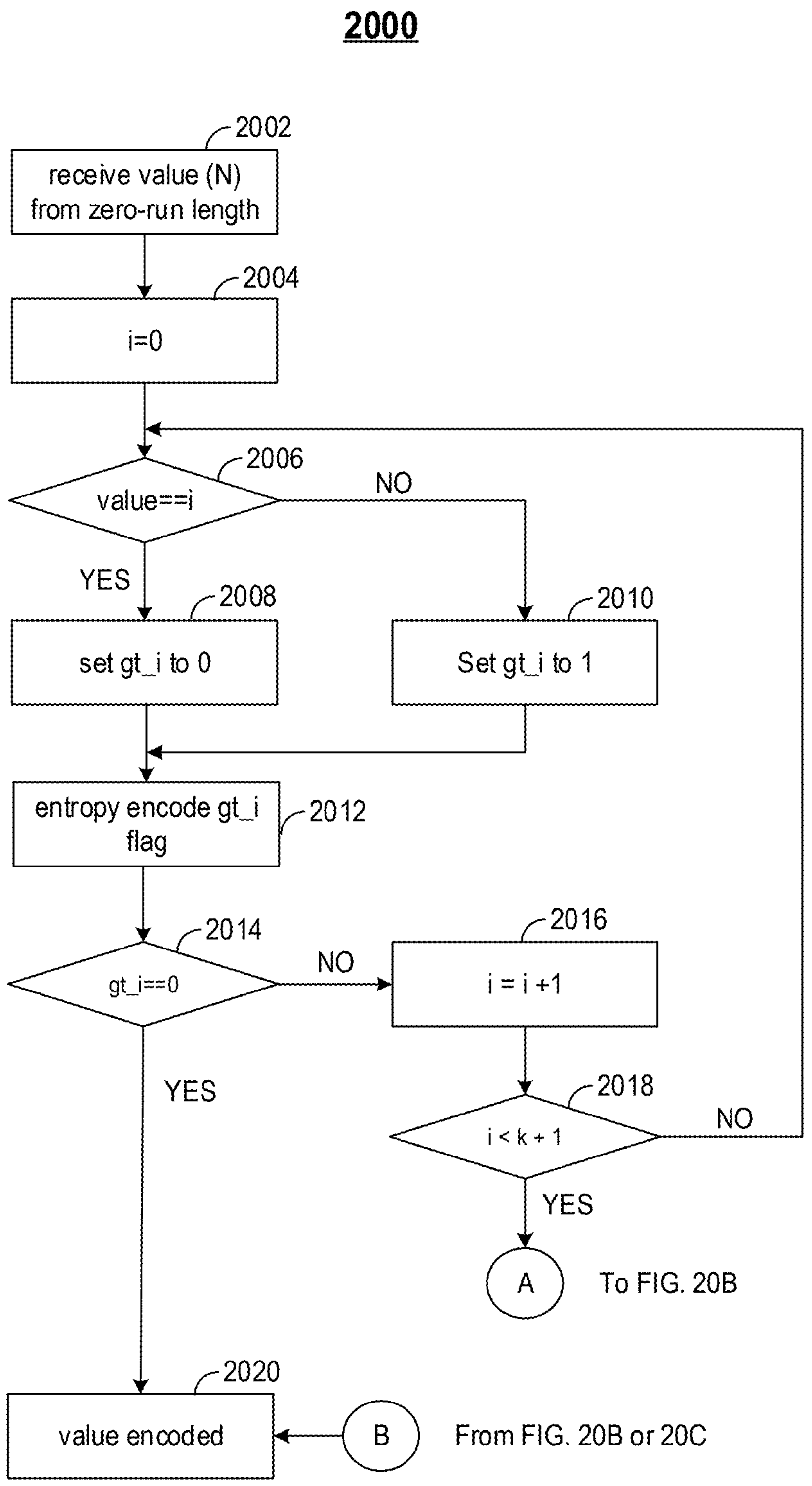
FIGS. 20A-20C illustrate an exemplary zero-run length value coding flow diagram, according to some embodiments of the present disclosure.
Figure 20B:
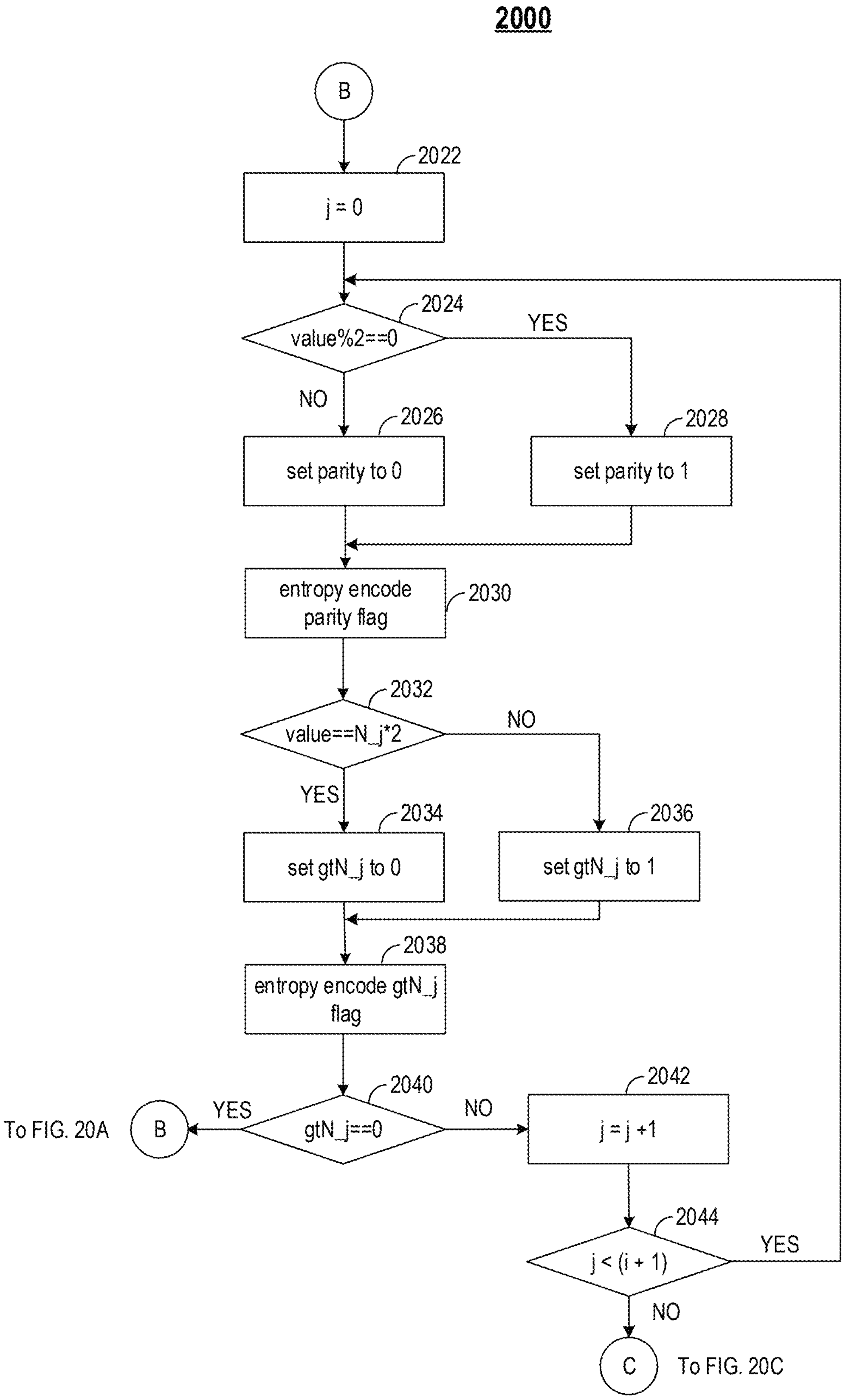
Figure 20C:
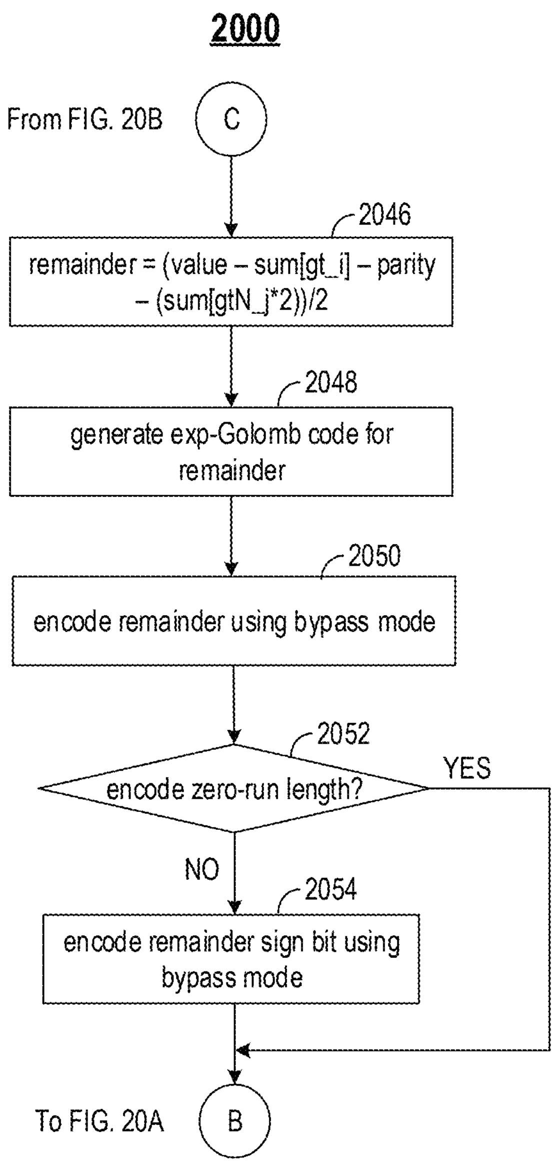

FIGS. 20A-20C illustrate an exemplary zero-run length value coding flow diagram 2000, according to some embodiments of the present disclosure.

Referring to FIG. 20A, at 2002, entropy encoder 1438 may receive a zero-run length value N from the zero-run length encoder 1436. At 2004, entropy encoder 1438 may set a first value of a first local variable i (e.g., i=0). At 2006, entropy encoder 1438 may determine whether the zero-run length value is equal to the first value of the first local variable (e.g., value==i). If "YES" at 2008, the operations may move to 2008, where entropy encoder 1438 may set a first flag (e.g., gt_i) associated with the first value of the first local variable to zero; otherwise, if "NO" at 2006, the operations may move to 2010, where entropy encoder 1438 may set the first flag associated with the first value of the first local variable to one.

At 2012, context-adaptive encoder 1442 may entropy encode the first flag associated with the first value of the first local variable. At 2014, entropy encoder 1438 may determine whether the first flag associated with the first value of the first local variable is equal to the first value of the first local variable (e.g., gt_i==0). If "YES" at 2014, the operations may move to 2020, where context-adaptive encoder 1442 may determine that the zero-run length value (e.g., N) is encoded; otherwise, if "NO" at 2014, the operations may move to 2016, where entropy encoder 1438 may increment the first value of the first local variable to a second value (e.g., i+1). At 2018, entropy encoder 1438 may determine whether the second value of the first local variable is less than a first value of an external variable k plus 1 (e.g., i<k+1). If "NO" at 2028, the operations may return to 2006; otherwise, if "YES" at 2018, the operations may move to 2022 in FIG. 20B.

Referring to FIG. 20B, at 2022, zero-run length encoder 1436 may initialize a first value of a second local variable j (e.g., j=0). At 2024, zero-run length encoder 1436 may determine whether the zero-run length value divided by 2 is equal to the first value of the second local variable. If "YES" at 2024, the operations may move to 2028, where zero-run length encoder 1436 may set a parity value N_j to 1; otherwise, if "NO" at 2024, the operations may move to 2026, where zero run length encoder 1437 may set the parity value to 0. The parity value may also be referred to as an "indicator bit." At 2030, entropy encoder 1438 may entropy encode the parity value. At 2032, zero-run length encoder 2032 may determine whether the zero-run length value is equal to the parity value multiplied by two. If "YES" at 2032, the operations may move to 2034, where zero-run length encoder 1436 may set a parity flag gtN_j (e.g., a second flag) to zero; otherwise, if "NO" at 2032, the operations may move to 2036, where zero-run length encoder 1436 may set the parity flag to 1. At 2038, context-adaptive encoder 1442 may entropy encode the parity flag. At 2040, zero-run length encoder 1436 may determine whether the parity flag is equal to the first value of the second local variable (e.g., gtN_j==0). If "YES" at 2040, the operations may return to 2020 in FIG. 20A; otherwise, if "NO" at 2040, zero-run length encoder 1436 may increment the first value of the second local variable to a second value (e.g., j+1). At 2044, zero-run length encoder 1436 may determine whether the second value of the second local variable is less than the second value of the first local variable plus 1. If "YES" at 2044, the operations may return to 2024; otherwise, if "NO" at 2044, the operations may move to 2046 in FIG. 20C.

Referring to FIG. 20C, zero-run length encoder 1436 may calculate a remainder of the zero-run length value for encoding, where the remainder=(value−sum[gt_i]−parity−(sum[gtN_j*2))/2. At 2048, zero-run length encoder 1436 may generate an exp-Golomb code for the remainder. At 2050, bypass encoder 1440 may encoder the remainder. At 2052, zero-run length encoder 1436 may determine whether the zero-run length value is encoded. If "NO" at 2052, bypass encoder 1440 may encode the remainder sign bit using a bypass mode; otherwise, if "YES" at 2052, the operations may move to 2020 in FIG. 20A. The generalization of the k-th order Exp-Golomb binarization process is described below.

In case of non-zero code the sign bit is encoded as 1, which indicates a positive number, and 0 indicates a negative number as follows in expression (3).

$$\text{coefficient} = (2*\text{sign}-1)*(gt0+gt1+\ldots+gtK+\text{parity}+(gtN1+gtN2+\ldots+gtN1+\text{remainder})*2+1), \tag{3}$$

where coefficient is non-zero wavelet coefficient, and the sign is a binary.

The bin string of the k-th order Exp-Golomb binarization process for each value symbolVal c(i) is specified as follows, where each call of the function put (X), with X being equal to 0 or 1, adds the binary value X at the end of the bin string:

```
absV = Abs( symbolVal )
stopLoop = 0
do
  if( absV >= ( 1 << k ) ) {
    put( 1 )
    absV = absV − ( 1 << k )
    k++
  } else {
    put( 0 )
    while( k− − )
      put( ( absV >> k ) & 1 )
    stopLoop = 1
  }
while( !stopLoop ).
```

The order of exp-Golomb code can be fixed or signaled in the bitstream, as shown in diagram 1925 of FIG. 19B.

Referring again to FIG. 14, for decoding, the flags and corresponding syntax elements are decoded from the bitstream by entropy decoder 1446 using context coding for flags and de-binarization of bypass coded remainder.

The values of coded displacement wavelet-transform coefficients are reconstructed by entropy decoder 1446 using expression (4)

$$\text{value} = \left(\sum_{i=0}^{k} gt_i + \text{parity} + \left(\text{remainder} + \sum_{j=0}^{l} gtN_j\right) * 2\right) ** (2 * \text{sign} - 1). \quad (4)$$

The zero-run length wavelet-transform coefficients may be reconstructed by zero-run length decoder 1444 using expression (5).

$$\text{value} = \sum_{i=0}^{k} \text{gt\_i} + \text{parity} + \left(\text{remainder} + \sum_{j=0}^{l} \text{gtN\_j}\right) * 2, \quad (5)$$

where, the values of k and i may be different for zero-run length and coefficient coding.

Figure 21:
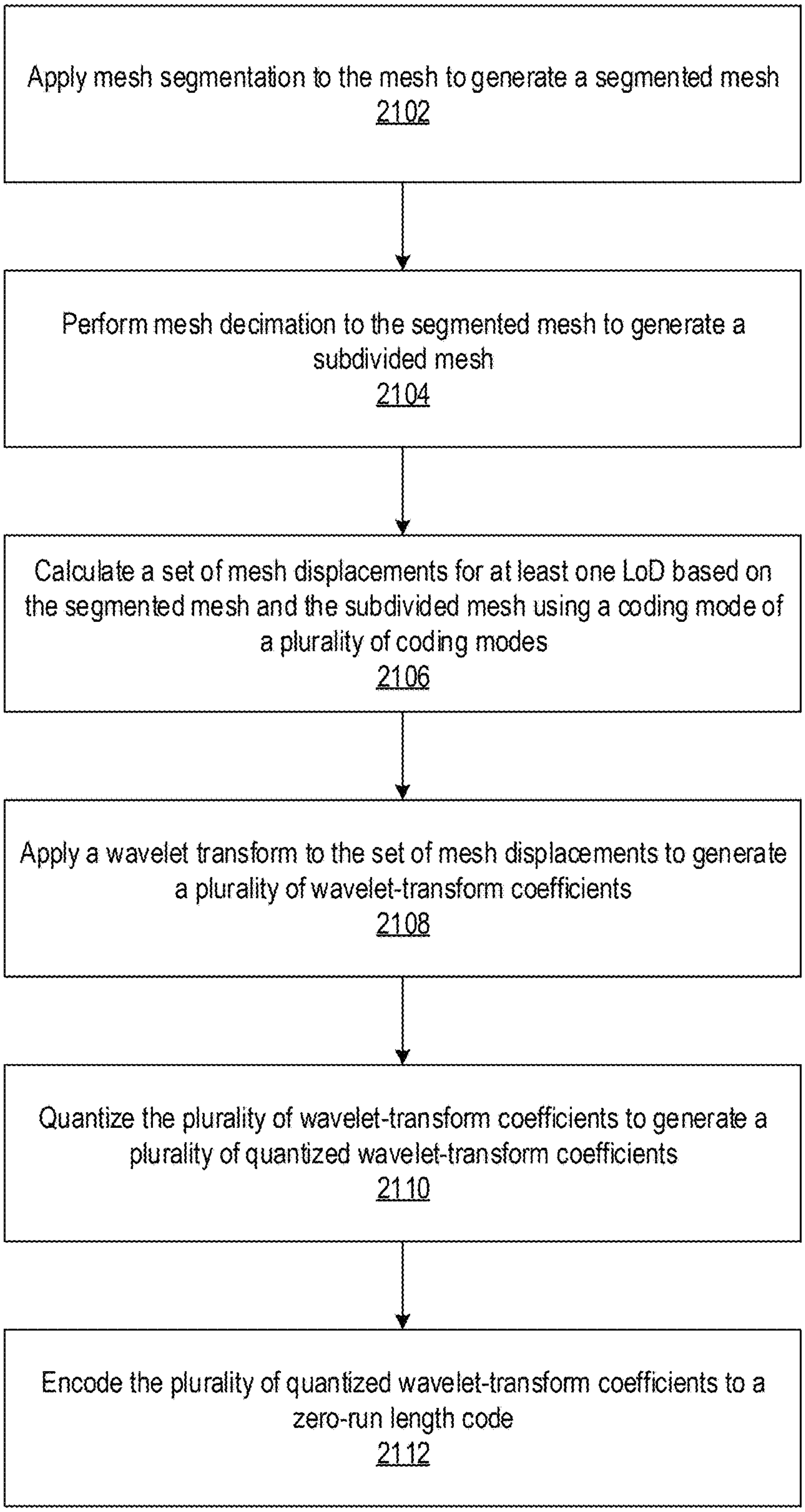
FIG. 21 illustrates a flowchart for a first exemplary mesh-encoding technique, according to some embodiments of the present disclosure.

FIG. 21 illustrates a flow chart of an exemplary method 2100 of mesh encoding, according to some embodiments of the present disclosure. Method 2100 may be performed by encoder 101 of encoding system 100 or any other suitable point cloud decoding systems. Method 2100 may include operations 2102-2112 as described below. It is understood that some of the operations may be optional, and some of the operations may be performed simultaneously, or in a different order other than shown in FIG. 21.

At 2102, the encoder may apply mesh segmentation to the mesh to generate a segmented mesh. For example, mesh segmentation may be applied to the mesh using any of the techniques described above in connection with FIGS. 14-20C.

At 2104, the encoder may perform mesh decimation to the segmented mesh to generate a subdivided mesh. For example, mesh decimation may be performed using any of the techniques described above in connection with FIGS. 14-20C.

At 2106, the encoder may calculate a set of mesh displacements for at least one LoD based on the segmented mesh and the subdivided mesh using a coding mode of a plurality of coding modes. For example, the set of mesh displacement may be calculated for at least one LoD using any of the techniques described above in connection with FIGS. 14-20C.

At 2108, the encoder may apply a wavelet transform to the set of mesh displacements to generate a plurality of wavelet-transform coefficients. For example, the wavelet transform may be applied to the set of mesh displacements using any of the techniques described above in connection with FIGS. 14-20C.

At 2110, the encoder may quantize the plurality of wavelet-transform coefficients to generate a plurality of quantized wavelet-transform coefficients. For example, the plurality of wavelet-transform coefficients may be quantized using any of the techniques described above in connection with FIGS. 14-20C.

At 2112, the encoder may encode the plurality of quantized wavelet-transform coefficients to a zero-run length code. For example, the plurality of quantized wavelet-transform coefficients may be encoded to a zero-run length code using any of the techniques described above in connection with FIGS. 14-20C.

FIG. 22 illustrates a flow chart of an exemplary method 2200 of point cloud decoding, according to some embodiments of the present disclosure. Method 2200 may be performed by decoder 201 of decoding system 200 or any other suitable point cloud decoding systems. Method 2200 may include operations 2202-2214 as described below. It is understood that some of the operations may be optional, and some of the operations may be performed simultaneously, or in a different order other than shown in FIG. 22.

At 2202, the decoder may decode a base mesh from a bitstream. For example, the base mesh may be decoded using any of the techniques described above in connection with FIGS. 14-20C.

At 2204, the decoder may perform mesh segmentation on the base mesh to generate a subdivided mesh indicated by the bitstream. For example, mesh segmentation may be performed using any of the techniques described above in connection with FIGS. 14-20C.

At 2206, the decoder may decode a first syntax element that indicates a first LoD associated with a sequence of frames. For example, the first syntax element may be decoded using any of the techniques described above in connection with FIGS. 14-20C.

At 2208, the decoder may decode a second syntax element that indicates a first coding mode associated with the sequence of frames at the first LoD. For example, the second syntax element may be decoded using any of the techniques described above in connection with FIGS. 14-20C.

At 2210, the decoder may decode a first zero-run length code to generate a first plurality of wavelet-transform coefficients based on the first LoD and the first coding mode associated with the sequence of frames. For example, the first zero-run length code may be decoded using any of the techniques described above in connection with FIGS. 14-20C.

At 2212, the decoder may generate a first set of mesh displacements for the sequence of frames based on the first plurality of wavelet-transform coefficients. For example, the first set of mesh displacements may be generated using any of the techniques described above in connection with FIGS. 14-20C.

At 2214, the decoder may generate a first reconstructed mesh based on the subdivided mesh and the first set of mesh displacements. For example, the first reconstructed mesh may be generated using any of the techniques described above in connection with FIGS. 14-20C.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a processor, such as processor 102 in FIGS. 1 and 2. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method for encoding a mesh that is represented in a 1D array that includes a set of points is provided. The method may include applying, by at least one processor, mesh segmentation to the mesh to generate a segmented mesh. The method may include performing, by the at least one processor, mesh decimation to the segmented mesh to generate a subdivided mesh. The method may include calculating, by the at least one processor, a set of mesh displacements for at least one LoD based on the segmented mesh and the subdivided mesh using a coding mode of a plurality of coding modes. The method may include applying, by the at least one processor, a wavelet transform to the set of mesh displacements to generate a plurality of wavelet-transform coefficients. The method may include quantizing, by the at least one processor, the plurality of wavelet-transform coefficients to generate a plurality of quantized wavelet-transform coefficients. The method may include encoding, by the at least one processor, the plurality of quantized wavelet-transform coefficients to a zero-run length code.

In some embodiments, the method may include receiving, by the at least one processor, a first indication of the at least one LoD for use in calculating the set of mesh displacements. In some embodiments, the method may include receiving, by the at least one processor, a second indication of the coding mode of the plurality of coding modes for use in calculating the set of mesh displacements.

In some embodiments, the receiving, by the at least one processor, the second indication of the coding mode of the plurality of coding modes for use in calculating the set of mesh displacements may include receiving a first syntax element that indicates a first coding mode of the plurality of coding mode for use in encoding a sequence of frames. In some embodiments, the receiving, by the at least one processor, the second indication of the coding mode of the plurality of coding modes for use in calculating the set of mesh displacements may include receiving a second syntax element that indicates a second coding mode of the plurality of coding modes for use in encoding a frame that follows the sequence of frames.

In some embodiments, the first syntax element may include a dmsps_mesh_LoD_coding_mode[i] syntax element. In some embodiments, the second syntax element includes a dmpps_mesh_LoD_coding_mode[i] syntax element. In some embodiments, i represents an index of the level of details associated with the coding mode.

In some embodiments, the coding mode of the plurality of coding modes may include a skip-coding mode, a simple-coding mode, or a full-coding mode.

In some embodiments, the skip-coding mode may be associated with a skipping of mesh displacement coding. In some embodiments, the simple-coding mode may be associated with a normal-vector component. In some embodiments, the full-coding mode may be associated with a normal-vector component, a tangent-vector component, and a bi-tangent-vector component.

In some embodiments, the method may include initializing, by the at least one processor, a first value of a first local variable associated with an LoD index, a first value of a second local variable may be associated with a vector-component index, and a first value of a third local variable may be associated with a quantized wavelet-transform coefficient index. In some embodiments, the method may include separating, by the at least one processor, the at least one LoD into a plurality of LoD subarrays. In some embodiments, the method may include separating, by the at least one processor, the normal vector-component, the tangent-vector component, and the bi-tangent-vector component into a plurality of vector-component subarrays. In some embodiments, the method may include initializing, by the at least one processor, a context model for each of the plurality of LoD subarrays and each of the plurality of vector-component subarrays.

In some embodiments, in response to the first value of the first local variable associated with the LoD index being less than a maximum LoD threshold value, the method may include determining, by the at least one processor, whether the first value of the second local variable associated with the vector-component index is less than a vector-component threshold value. In some embodiments, in response to the first value of the second local variable associated with the vector-component index being less than the vector-component threshold value, the method may include determining, by the at least one processor, whether the first value of the third local variable associated with the quantized wavelet-transform coefficient index is less than a maximum number of elements in the plurality of quantized wavelet-transform coefficients. In some embodiments, in response to the first value of the third local variable associated with the quantized wavelet-transform coefficient index being less than a maximum number of elements in the plurality of quantized wavelet-transform coefficients, the method may include incrementing, by the at least one processor, the first value of the third local variable associated with the quantized wavelet-transform coefficient index to a second value.

In some embodiments, the method may include determining, by the at least one processor, whether the second value of the third local variable associated with the quantized wavelet-transform coefficient index is less than the maximum number of elements in the plurality of quantized wavelet-transform coefficients.

In some embodiments, in response to the first value of the second local variable associated with the vector-component index not being less than the vector-component threshold value, the method may include incrementing, by the at least one processor, the first value of the first local variable associated with the LoD index to a second value. In some embodiments, the method may include determining, by the at least one processor, whether the second value of the first local variable associated with the LoD index is less than the maximum LoD threshold value.

In some embodiments, in response to the first value of the third local variable associated with the quantized wavelet-transform coefficient index not being less than the maximum number of elements in the plurality of quantized wavelet-transform coefficients, the method may include incrementing, by the at least one processor, the first value of the second local variable associated with the vector-component index to a second value. In some embodiments, the method may include determining, by the at least one processor, whether the second value of the second local variable associated with the vector-component index is less than the vector-component threshold value.

In some embodiments, in response to the first value of the first local variable associated with the LoD index not being less than a maximum LoD threshold value, the method may include reducing, by the at least one processor, the maximum number of elements in the plurality of quantized wavelet-transform coefficients to a subset of elements. In some embodiments, the method may include encoding, by the at least one processor, subset of elements of the plurality of quantized wavelet-transform coefficients.

In some embodiments, the encoding, by the at least one processor, the plurality of quantized wavelet-transform coefficients to the zero-run length code may include entropy encoding the subset of elements of the plurality of quantized wavelet-transform coefficients to the zero-run length code.

According to another aspect of the present disclosure, a system for encoding a mesh that is represented in a 1D array that includes a set of points is provided is provided. The system may include at least one processor and memory storing instructions. The memory storing instructions, which when executed by the at least one processor, may cause the at least one processor to apply mesh segmentation to the mesh to generate a segmented mesh. The memory storing instructions, which when executed by the at least one processor, may cause the at least one processor to perform mesh decimation to the segmented mesh to generate a subdivided mesh. The memory storing instructions, which when executed by the at least one processor, may cause the at least one processor to calculate a set of mesh displacements for at least one LoD based on the segmented mesh and the subdivided mesh using a coding mode of a plurality of coding modes. The memory storing instructions, which when executed by the at least one processor, may cause the at least one processor to apply a wavelet transform to the set of mesh displacements to generate a plurality of wavelet-transform coefficients. The memory storing instructions, which when executed by the at least one processor, may cause the at least one processor to quantize the plurality of wavelet-transform coefficients to generate a plurality of quantized wavelet-transform coefficients. The memory storing instructions, which when executed by the at least one processor, may cause the at least one processor to encode the plurality of quantized wavelet-transform coefficients to a zero-run length code.

According to one aspect of the present disclosure, a method for decoding a mesh that is represented in a 1D array that includes a set of points is provided. The method may include decoding, by a at least one processor, a base mesh from a bitstream. The method may include performing, by the at least one processor, mesh segmentation on the base mesh to generate a subdivided mesh indicated by the bitstream. The method may include decoding, by the at least one processor, a first syntax element that indicates a first LoD associated with a sequence of frames. The method may include decoding, by the at least one processor, a second syntax element that indicates a first coding mode associated with the sequence of frames at the first LoD. The method may include decoding, by the at least one processor, a first zero-run length code to generate a first plurality of wavelet-transform coefficients based on the first LoD and the first coding mode associated with the sequence of frames. The method may include generating, by the at least one processor, a first set of mesh displacements for the sequence of frames based on the first plurality of wavelet-transform coefficients. The method may include generating, by the at least one processor, a first reconstructed mesh based on the subdivided mesh and the first set of mesh displacements.

In some embodiments, the method may include decoding, by the at least one processor, a third syntax element that indicates a second LoD associated with a frame that follows the sequence of frames is different than the first LoD associated with the sequence of frames. In some embodiments, the method may include decoding, by the at least one processor, a fourth syntax element that indicates the second LoD associated with the frame that follows the sequence of frames. In some embodiments, the method may include decoding, by the at least one processor, a fifth syntax element that indicates a second coding mode associated with the frame that follows the sequence of frames.

In some embodiments, the second coding mode may be the same or different than the first coding mode.

In some embodiments, the method may include decoding, by the at least one processor, a second zero-run length code to generate a second plurality of wavelet-transform coefficients based on the second LoD and the second coding mode associated with the frame that follows the sequence of frames. In some embodiments, the method may include generating, by the at least one processor, a second set of mesh displacements for the frame that follows the sequence of frames based on the second plurality of wavelet-transform coefficients. In some embodiments, the method may include generating, by the at least one processor, a second reconstructed mesh based on the subdivided mesh and the second set of mesh displacements.

In some embodiments, the first syntax element may include a dmsps_mesh_LoD_count_minus_1 plus one syntax element. In some embodiments, the second syntax element may include a dmsps_mesh_LoD_coding_mode[i] syntax element. In some embodiments, the third syntax element may include a displacement picture parameter set (dmpps)_mesh_LoD_count_override_flag syntax element. In some embodiments, the fourth syntax element may include a dmpps_mesh_LoD_count_minus_1 plus one syntax element. In some embodiments, the fifth syntax element may include a dmpps_mesh_LoD_coding_mode[i] syntax element. In some embodiments, i may represent an index of the LoD associated with the coding mode.

According to still a further aspect of the present disclosure, a system for decoding a mesh that is represented in a 1D array is provided. The system may include at least one processor and memory storing instructions. The memory storing instructions, which when executed by the at least one processor, may cause the at least one processor to decode a base mesh from a bitstream. The memory storing instructions, which when executed by the at least one processor, may cause the at least one processor to perform mesh segmentation on the base mesh to generate a subdivided mesh indicated by the bitstream. The memory storing instructions, which when executed by the at least one processor, may cause the at least one processor to decode a first syntax element that indicates a first LoD associated with a sequence of frames. The memory storing instructions, which when executed by the at least one processor, may cause the at least one processor to decode a second syntax element that indicates a coding mode associated with the sequence of frames at the first LoD. The memory storing instructions, which when executed by the at least one processor, may cause the at least one processor to decode a first zero-run length code to generate a first plurality of wavelet-transform coefficients based on the first LoD and the first coding mode associated with the sequence of frames. The memory storing instructions, which when executed by the at least one processor, may cause the at least one processor to generate a first set of mesh displacements for the sequence of frames based on the first plurality of wavelet-transform coefficients. The memory storing instructions, which when executed by the at least one processor, may cause the at least one processor to generate a first reconstructed mesh based on the subdivided mesh and the first set of mesh displacements.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method for encoding a mesh, the mesh being represented in a one-dimension (1D) array comprising a set of points, the method comprising:

applying, by at least one processor, mesh segmentation to the mesh to generate a segmented mesh;

performing, by the at least one processor, mesh decimation to the segmented mesh to generate a subdivided mesh;

calculating, by the at least one processor, a set of mesh displacements for at least one level-of-detail (LoD) based on the segmented mesh and the subdivided mesh using a coding mode of a plurality of coding modes;

applying, by the at least one processor, a wavelet transform to the set of mesh displacements to generate a plurality of wavelet-transform coefficients;

quantizing, by the at least one processor, the plurality of wavelet-transform coefficients to generate a plurality of quantized wavelet-transform coefficients; and encoding, by the at least one processor, the plurality of quantized wavelet-transform coefficients to a zero-run length code.

2. The method of claim 1, further comprising:

receiving, by the at least one processor, a first indication of the at least one LoD for use in calculating the set of mesh displacements; and receiving, by the at least one processor, a second indication of the coding mode of the plurality of coding modes for use in calculating the set of mesh displacements.

3. The method of claim 2, wherein the receiving, by the at least one processor, the second indication of the coding mode of the plurality of coding modes for use in calculating the set of mesh displacements comprises:

receiving a first syntax element that indicates a first coding mode of the plurality of coding mode for use in encoding a sequence of frames; or receiving a second syntax element that indicates a second coding mode of the plurality of coding modes for use in encoding a frame that follows the sequence of frames.

4. The method of claim 3, wherein:

the first syntax element includes a displacement sequence parameter set (dmsps)_mesh_LoD_coding_mode[i] syntax element, the second syntax element includes a displacement picture parameter set (dmpps)_mesh_LoD_coding_mode[i] syntax element, and i represents an index of the level of details associated with the coding mode.

5. The method of claim 1, wherein the coding mode of the plurality of coding modes includes a skip-coding mode, a simple-coding mode, or a full-coding mode.

6. The method of claim 5, wherein:

the skip-coding mode is associated with a skipping of mesh displacement coding, the simple-coding mode is associated with a normal-vector component, and the full-coding mode is associated with a normal-vector component, a tangent-vector component, and a bi-tangent-vector component.

7. The method of claim 6, further comprising:

initializing, by the at least one processor, a first value of a first local variable associated with an LoD index, a first value of a second local variable associated with a vector-component index, and a first value of a third local variable associated with a quantized wavelet-transform coefficient index;

separating, by the at least one processor, the at least one LoD into a plurality of LoD subarrays;

separating, by the at least one processor, the normal vector-component, the tangent-vector component, and the bi-tangent-vector component into a plurality of vector-component subarrays; and initializing, by the at least one processor, a context model for each of the plurality of LoD subarrays and each of the plurality of vector-component subarrays.

8. The method of claim 7, further comprising:

in response to the first value of the first local variable associated with the LoD index being less than a maximum LoD threshold value, determining, by the at least one processor, whether the first value of the second local variable associated with the vector-component index is less than a vector-component threshold value;

in response to the first value of the second local variable associated with the vector-component index being less than the vector-component threshold value, determining, by the at least one processor, whether the first value of the third local variable associated with the quantized wavelet-transform coefficient index is less than a maximum number of elements in the plurality of quantized wavelet-transform coefficients; and in response to the first value of the third local variable associated with the quantized wavelet-transform coefficient index being less than a maximum number of elements in the plurality of quantized wavelet-transform coefficients, incrementing, by the at least one processor, the first value of the third local variable associated with the quantized wavelet-transform coefficient index to a second value.

9. The method of claim 8, further comprising:

determining, by the at least one processor, whether the second value of the third local variable associated with the quantized wavelet-transform coefficient index is less than the maximum number of elements in the plurality of quantized wavelet-transform coefficients.

10. The method of claim 8, further comprising:

in response to the first value of the second local variable associated with the vector-component index not being less than the vector-component threshold value, incrementing, by the at least one processor, the first value of the first local variable associated with the LoD index to a second value; and determining, by the at least one processor, whether the second value of the first local variable associated with the LoD index is less than the maximum LoD threshold value.

11. The method of claim 8, further comprising:

in response to the first value of the third local variable associated with the quantized wavelet-transform coefficient index not being less than the maximum number of elements in the plurality of quantized wavelet-transform coefficients, incrementing, by the at least one processor, the first value of the second local variable associated with the vector-component index to a second value; and determining, by the at least one processor, whether the second value of the second local variable associated with the vector-component index is less than the vector-component threshold value.

12. The method of claim 8, further comprising:

in response to the first value of the first local variable associated with the LoD index not being less than a maximum LoD threshold value, reducing, by the at least one processor, the maximum number of elements in the plurality of quantized wavelet-transform coefficients to a subset of elements; and encoding, by the at least one processor, subset of elements of the plurality of quantized wavelet-transform coefficients.

13. The method of claim 12, wherein the encoding, by the at least one processor, the plurality of quantized wavelet-transform coefficients to the zero-run length code comprises:

entropy encoding the subset of elements of the plurality of quantized wavelet-transform coefficients to the zero-run length code.

14. A method for decoding a mesh, the mesh being represented in a one-dimension (1D) array comprising a set of points, the method comprising:

decoding, by a at least one processor, a base mesh from a bitstream;

performing, by the at least one processor, mesh segmentation on the base mesh to generate a subdivided mesh indicated by the bitstream;

decoding, by the at least one processor, a first syntax element that indicates a first level-of-detail (LoD) associated with a sequence of frames;

decoding, by the at least one processor, a second syntax element that indicates a first coding mode associated with the sequence of frames at the first LoD;

decoding, by the at least one processor, a first zero-run length code to generate a first plurality of wavelet-transform coefficients based on the first LoD and the first coding mode associated with the sequence of frames;

generating, by the at least one processor, a first set of mesh displacements for the sequence of frames based on the first plurality of wavelet-transform coefficients; and generating, by the at least one processor, a first reconstructed mesh based on the subdivided mesh and the first set of mesh displacements.

15. The method of claim 14, further comprising:

decoding, by the at least one processor, a third syntax element that indicates a second LoD associated with a frame that follows the sequence of frames is different than the first LoD associated with the sequence of frames;

decoding, by the at least one processor, a fourth syntax element that indicates the second LoD associated with the frame that follows the sequence of frames; and decoding, by the at least one processor, a fifth syntax element that indicates a second coding mode associated with the frame that follows the sequence of frames.

16. The method of claim 15, wherein the second coding mode is the same or different than the first coding mode.

17. The method of claim 15, further comprising:

decoding, by the at least one processor, a second zero-run length code to generate a second plurality of wavelet-transform coefficients based on the second LoD and the second coding mode associated with the frame that follows the sequence of frames;

generating, by the at least one processor, a second set of mesh displacements for the frame that follows the sequence of frames based on the second plurality of wavelet-transform coefficients; and generating, by the at least one processor, a second reconstructed mesh based on the subdivided mesh and the second set of mesh displacements.

18. The method of claim 15, wherein:

the first syntax element includes a displacement sequence parameter set (dmsps)_mesh_LoD_count_minus_1 plus one syntax element, the second syntax element include a dmsps_mesh_LoD_coding_mode[i] syntax element, the third syntax element includes a displacement picture parameter set (dmpps)_mesh_LoD_count_override_flag syntax element, the fourth syntax element includes a dmpps_mesh_LoD_count_minus_1 plus one syntax element, the fifth syntax element includes a dmpps_mesh_LoD_coding_mode[i] syntax element, and i represents an index of the level of details associated with the coding mode.

19. A system for decoding a mesh, the mesh being represented in a one-dimension (1D) array comprising a set of points, the system comprising:

at least one processor; and memory storing instructions, which when executed by the at least one processor, cause the at least one processor to:

decode a base mesh from a bitstream;

perform mesh segmentation on the base mesh to generate a subdivided mesh indicated by the bitstream;

decode a first syntax element that indicates a first level-of-detail (LoD) associated with a sequence of frames;

decode a second syntax element that indicates a coding mode associated with the sequence of frames at the first LoD;

decode a first zero-run length code to generate a first plurality of wavelet-transform coefficients based on the first LoD and the first coding mode associated with the sequence of frames;

generate a first set of mesh displacements for the sequence of frames based on the first plurality of wavelet-transform coefficients; and generate a first reconstructed mesh based on the subdivided mesh and the first set of mesh displacements.

20. The system of claim 19, wherein the instructions, which when executed by the at least one processor, cause the at least one processor further to:

decode a third syntax element that indicates a second LoD associated with a frame that follows the sequence of frames is different than the first LoD associated with the sequence of frames;

decode a fourth syntax element that indicates the second LoD associated with the frame that follows the sequence of frames; and decode a fifth syntax element that indicates a second coding mode associated with the frame that follows the sequence of frames.

* * * * *